United States Patent
Wilkinson, III

(10) Patent No.: US 12,164,492 B1
(45) Date of Patent: Dec. 10, 2024

(54) SYSTEMS AND METHODS FOR COMPUTER MODELING AND VISUALIZING ENTITY ATTRIBUTES

(71) Applicant: The PNC Financial Services Group, Inc., Pittsburgh, PA (US)

(72) Inventor: John Glenn Wilkinson, III, Gibsonia, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 0 days.

(21) Appl. No.: 18/501,194

(22) Filed: Nov. 3, 2023

Related U.S. Application Data

(60) Provisional application No. 63/422,886, filed on Nov. 4, 2022.

(51) Int. Cl.
*G06F 16/22* (2019.01)
*G06F 3/0484* (2022.01)
*G06F 16/25* (2019.01)
*G06F 40/174* (2020.01)

(52) U.S. Cl.
CPC ........ *G06F 16/2228* (2019.01); *G06F 3/0484* (2013.01); *G06F 16/258* (2019.01); *G06F 40/174* (2020.01)

(58) Field of Classification Search
CPC .. G06F 16/2228; G06F 3/0484; G06F 16/258; G06F 40/174
See application file for complete search history.

(56) References Cited

U.S. PATENT DOCUMENTS

2011/0289091 A1\* 11/2011 Collins ................. G06Q 10/10
707/741

\* cited by examiner

*Primary Examiner* — Mark D Featherstone
*Assistant Examiner* — Kweku William Halm
(74) *Attorney, Agent, or Firm* — FINNEGAN, HENDERSON, FARABOW, GARRETT & DUNNER, LLP

(57) ABSTRACT

At least one processor configured to perform operations including receiving data from a plurality of disparate data sources; distilling the data into a plurality of indexes to convert the data into the plurality of indexes to be usable by a single data structure; retrieving a first set of data elements from the plurality of indexes associated with a first plurality of entities; retrieving a second set of data elements from the plurality of indexes associated with a second plurality of entities; generating a predicted duration of time that the first plurality of entities will remain in a first position using the second set of data elements associated with the second plurality of entities; assigning a first velocity index to each of the first plurality of entities to obtain a plurality of first velocity indexes; assigning a second velocity index to each of the second plurality of entities to obtain a plurality of second velocity indexes; comparing each of the first velocity indexes to other first velocity indexes; comparing each of the second velocity indexes to other second velocity indexes; and generating, a velocity model.

18 Claims, 21 Drawing Sheets

PROMOTION VELOCITY

| Career Level Job Family Group Name | Headcount | | | Median Years to Promotion Difference from Expected | | | |
|---|---|---|---|---|---|---|---|
| | Total | POC | Non POC | Expected | POC | Non POC | Gap |
| Operations | 49 | 18 | 31 | 4.4 | 0.4 | 0.1 | 0.22 |
| Technology | 56 | 14 | 42 | 4.4 | 0.6 | 1.7 | -1.05 |
| Operations | 62 | 14 | 48 | 4.0 | -0.8 | -0.9 | 0.16 |
| Technology | 147 | 39 | 108 | 2.3 | -0.1 | -0.1 | -0.01 |
| Technology | 139 | 27 | 112 | 2.9 | 0.1 | -0.3 | 0.35 |
| Technology | 215 | 36 | 179 | 4.2 | 0.1 | -0.3 | 0.37 |
| Technology | 95 | 18 | 77 | 4.5 | -0.7 | -0.2 | -0.48 |

TIME IN CAREER LEVEL

| Career Level Job Family Group Name | Headcount | | | Median Years in Career Level Difference from Expected | | | |
|---|---|---|---|---|---|---|---|
| | Total | Female | Non Female | Expected | Female | Non Female | Gap |
| Technology | 69 | 10 | 59 | 5.5 | 3.9 | 3.2 | 0.8 |
| Operations | 46 | 34 | 12 | 4.0 | 0.4 | 0.2 | 0.2 |
| Technology | 93 | 25 | 68 | 4.4 | 2.3 | 2.4 | -0.1 |
| Operations | 44 | 29 | 15 | 1.7 | 0.3 | 0.7 | -0.4 |
| Technology | 86 | 23 | 63 | 4.1 | 2.5 | 0.7 | 1.8 |
| Project/Process Management | 44 | 15 | 29 | 4.3 | 1.4 | 1.5 | 0.0 |
| Technology | 203 | 42 | 161 | 4.7 | 2.0 | 1.7 | 0.3 |
| Technology | 162 | 29 | 133 | 4.8 | 3.3 | 2.0 | 1.2 |
| Technology | 89 | 12 | 77 | 5.6 | 2.0 | 1.8 | 0.2 |

SYSTEMS AND METHODS FOR COMPUTER MODELING AND VISUALIZING ENTITY ATTRIBUTES

CROSS REFERENCE TO RELATED APPLICATIONS

This application claims the benefit of priority of U.S. Provisional Patent Application No. 63/422,886, filed on Nov. 4, 2022, the entire contents of which are incorporated herein by reference.

TECHNICAL FIELD

The present disclosure relates generally to systems and methods for computer modeling and visualizing entity attributes. More specifically, and without limitation, this disclosure relates to managing aspects of human resources for the workforce of an organization.

BACKGROUND

Title VII of the Civil Rights Act of 1964, as amended, protects employees and job applicants from employment discrimination based on race, color, religion, sex, and national origin. Accordingly, companies are obligated by Title VII to prevent such discrimination from occurring within the workplace Attracting and retaining talented individuals is crucial to an organization's success. As such, it is important to remove or minimize any impediment to the career advancement of its employees, for any reason unrelated to work performance, regardless of an employee's classification.

As Mckinsey reported on Mar. 1, 2022, for example, research has shown that a strong relationship exists between diversity on leadership teams and the likelihood of financial outperformance for companies, and for example, in regard to gender parity, the most gender-diverse companies are 48 percent more likely to outperform the least gender-diverse companies. (https://www.mckinsey.com/industries/technology-media-and-telecommunications/our-insights/repairing-the-broken-rung-on-the-career-ladder-for-women-in-technical-roles) Nevertheless, Mckinsey reports that many companies are missing out on this. While there has been an increased focus in the industry on parity in new hires, when barriers to early promotion arise, e.g., a "broken rung" arises, this impacts parity in leadership despite best efforts by creating a bottleneck in employee career advancement. Such a bottleneck is often also referred to as a "glass ceiling."

Leadership in an organization often lack direct insight into the cause of a broken rung or even where within the organization a broken rung has occurred. There is a need for technological tools to impart this insight to leadership in an organization. Systemic bias within organizations is pervasive yet often not well understood. And there are no analytical tools to define or address systemic bias. To continue progress in acknowledging, identifying, and addressing systemic bias, there is a need for improved systems that provide information on at least one of the following: current demographic representation within an organization; whether the demographic representation is equal in critical work; whether employees move at a similar rate through a company; differences in termination risk; and future demographic representation based on adjusted promotion, hiring, and termination strategies.

SUMMARY

Disclosed herein are systems and methods that generate metrics at given points throughout the employment of an employee and transform those metrics about specific employees in a particular manner by applying inventive principles disclosed herein, in order to systematically identify where barriers to career advancement exist for members of protected classes. The metrics may lead to actions that improve the odds of increased representation over time without quotas, objectives or other constraints on employees.

For example, an organization may not be aware that, due to a social or structural barrier, employees of a particular class in a particular business working on similar work as employees in a second business are not being promoted at the same rate as in the first business. Because there are no tools to identify such a disparity, the organization may never become aware of this disparity. Using the systems and methods disclosed herein, an organization may observe metrics generated over time, transform those metrics as described herein, and generate a promotion velocity score for employees engaged in, e.g., similar work performed by employees of a same rank or grade across the organization. Applying the systems and methods described herein, the organization may use those generated scores to identity a source of the disparity.

In view of the foregoing, embodiments of the present disclosure address disadvantages of existing systems by providing novel computer-implemented systems and methods for (i) identifying and predicting inequality outcomes in a job role, (ii) predicting attrition of employees in a job role, and (iii) predicting the diversity of an organization within a company over a duration of time.

Embodiments of the present disclosure provide a non-transitory computer readable medium storing instructions, that, when executed by at least one processor, cause the at least one processor to perform operations for identifying a velocity model for a plurality of positions. For example, a plurality of positions may refer to a plurality of job roles in an organization. The operations may include receiving data from a plurality of disparate data sources, the data including a plurality of variables. Each variable of the plurality of variables may be associated with a data type and an entity of a total plurality of entities.

The operations may include distilling the data into a plurality of indexes to convert the data into the plurality of indexes to be usable by a single data structure by assigning a binary value to each variable of the plurality of variables, wherein each variable is a categorical value, a numerical value, or an ordinal value, by generating, using the binary value of each variable, an index for each data type and each entity of the total plurality of entities and by storing each index in a database. A first set of data elements may be retrieved from the plurality of indexes. The first set of data elements may be associated with a first plurality of entities of the total plurality of entities. A second set of data elements may be retrieved from the plurality of indexes. The second set of data elements may be associated with a second plurality of entities of the total plurality of entities.

The operations may further include generating a predicted duration of time that the first plurality of entities will remain in a first position using the second set of data elements associated with the second plurality of entities. A first velocity index may be assigned to each of the first plurality of entities to obtain a plurality of first velocity indexes. The first velocity index may be directly proportional to a measure of closeness between the predicted duration and the actual duration of time in the position in the first set of data elements. A second velocity index may be assigned to each of the second plurality of entities to obtain a plurality of second velocity index. The second velocity index may be directly proportional to a measure of closeness between the predicted duration and the actual duration of time in the position in the second set of data elements.

The operations may further include comparing each of the first velocity indexes to other first velocity indexes from among the plurality of first velocity indexes. The comparing may include identifying differences between each of the first velocity indexes and identifying information associated with a data category of each of the first plurality of entities. The operations may further include comparing each of the second velocity indexes to other second velocity indexes from among the plurality of second velocity indexes. The comparing may include identifying differences between each of the second velocity indexes and identifying information associated with the data category of each of the second plurality of entities. The operations may further include generating, using the first plurality of velocity indexes and the second plurality of velocity indexes, a velocity model. In some embodiments, the operations may be performed for a plurality of positions.

The operations may further comprise creating a distribution of the velocity indexes that may include the first and second velocity indexes. The operations may further include generating a score associated with an expectation that one or more entities in the first plurality of entities will move to another position and generating, using the score, a quantity of a projected first plurality of entities in the position over a duration of time.

In some embodiments, the operations may include generating a user interface containing information entry fields for receiving user input regarding diversity input parameters and providing the graphical user interface for display on a user device. The operations may also include receiving from the user interface one or more input parameters. The operations may further include generating a second projected first plurality of entities in the position over the duration of time based on the one or more input parameters.

In some embodiments, the operations described above may include a method for identifying a velocity model for a plurality of positions and predicting outcomes for the plurality of positions (e.g., identifying and predicting inequality outcomes in a job role). In other embodiments, the operations described above may be performed by at least one processor configured to execute instructions in a system for identifying a velocity model for a plurality of positions and predicting outcomes for the plurality of positions.

In some embodiments, a non-transitory computer readable medium storing instructions that, when executed by at least one processor, cause the at least one processor to perform operations for predicting attrition using an attrition index. The operations may include receiving data from a plurality of disparate data sources. The data may include a plurality of variables, wherein each variable of the plurality of variables is associated with a data type and an entity of a plurality of entities in a position. The operations may further include distilling the data into a plurality of indexes. The distilling may convert the data into a plurality of indexes to be usable by a single data structure. The data conversion may be performed by assigning a binary value to each variable of the plurality of variables, wherein each variable is a categorical value, a numerical value, or an ordinal value, by generating, using the binary value of each variable, an index for each data type and each entity of the plurality of entities and by storing each index in a database.

The operations may further include retrieving a set of data elements from the plurality of indexes, wherein the set of data elements may include information associated with the plurality of entities. The set of data elements may include information associated with at least one of tenure, years in the job role, age, commute distance, performance, and payroll data. An attrition index may be assigned to each of the information included in the set of data elements. The operations may further comprise predicting, using the attrition index, attrition for each entity of the plurality of entities, wherein the attrition is a binary event.

The operations may further include creating a distribution of attrition for the position, wherein the distribution uses the attrition of each entity of the plurality of entities. The distribution may use the likelihood of attrition of each of the plurality of individuals. The operations may further comprise generating, using the distribution, a quantity of a projected plurality of entities in the position over a duration of time. The operations may further comprise generating a visualization of the distribution.

In some embodiments, the operations described above may be a method for predicting attrition for each entity of the plurality of entities based on an attrition index. In other embodiments, the operations described above may be performed by at least one processor configured to execute instructions in a system for predicting attrition for each entity of the plurality of entities based on an attrition index.

In some embodiments, a non-transitory computer readable medium storing instructions that, when executed by at least one processor, cause the at least one processor to perform operations for predicting the expected composition of entities in a position (e.g., predicting diversity of an organization within a company) over a duration of time is provided. The operations may include receiving data from a plurality of disparate data sources. The data may include a plurality of variables, wherein each variable of the plurality of variables is associated with a data type and an entity of a plurality of entities in a first position.

The operations may further include distilling the data into a plurality of indexes. The distilling may convert the data into the plurality of indexes to be usable by a single data structure by assigning a binary value to each variable of the plurality of variables, wherein each variable is a categorical value, a numerical value, or an ordinal value, by generating, using the binary value of each variable, an index for each data type and each entity of the plurality of entities and by storing each index in a database.

The operations may include retrieving a first set of data elements associated with the plurality of entities from the plurality of indexes, wherein the first set of data elements includes information associated with a velocity index, attrition, and network analytic index. The first set of data elements may include information associated with a velocity index, social networking score, pay equity score, engagement score, attrition, network analytic index and one or more demographic traits. The operations may include generating a first probability of moving to a first different position for each of the plurality of entities. The first probability may be calculated by a first mathematical transformation that includes the velocity index, attrition, and network analytic index.

The operations may include generating a second probability of moving to a second different position for each of the plurality of entities. The second probability may be calculated by a second mathematical transformation that includes the velocity index, attrition, and network analytic index. The operations may further include predicting a number of second entities. The number of second entities may include a number of entities expected to move to the first position.

The operations may also include generating a second set of data elements associated with a second plurality of entities. The generating may include applying a third mathematical transformation to the first probability, the second probability, and prediction of the number of second entities. The operations may further include generating an expected composition of entities in the first position. The generating may include identifying at least one data category of each of the second plurality of entities.

The operations may further include displaying a visualization of the expected composition. The operations may also include generating a graphical user interface containing information entry fields for receiving user input regarding input parameters. The operations may include providing the graphical user interface for display on a user device. The operations may further include receiving, from the graphical user interface via the user device, one or more input parameters. The one or more input parameters may change one or more of the first probability, the second probability, and the prediction of the number of second entities. The operations may further include generating a second expected composition of entities in the first position based on the one or more input parameters. The operations may further include displaying a second visualization of the second expected composition.

In some embodiments, the operations described above may be a method for predicting the diversity of an organization within a company over a duration of time. In other embodiments, the operations described above may be performed by at least one processor configured to execute instructions in a system for predicting diversity of an organization within a company over a duration of time.

In some embodiments, the operations described above may include a method for optimizing an organization's outreach, recruitment, work product, affinity groups, retention, employment, contracting, or diversity, equity, and inclusion (DEI) program. In other embodiments, the operations described above may be used in various applications to achieve qualitative or quantitative improvement in the diversity of an organization.

The systems and methods disclosed herein may be used in various applications and business systems. It is to be understood that the foregoing general description and the following detailed description are exemplary and explanatory only and are not restrictive of the disclosed embodiments.

BRIEF DESCRIPTION OF THE DRAWINGS

The accompanying drawings, which are incorporated in and constitute a part of this specification, illustrate disclosed embodiments and, together with the description, serve to explain the disclosed embodiments.

FIG. 6A illustrates an example of calculated promotion velocity medians of different demographic groups, according to embodiments of the present disclosure.

FIG. 6B illustrates an example of calculated time spent in a career level of different demographic groups, according to embodiments of the present disclosure.

DETAILED DESCRIPTION

Reference will now be made in detail to exemplary embodiments, discussed with regard to the accompanying drawings. In some instances, the same reference numbers will be used throughout the drawings and the following description to refer to the same or like parts. Unless otherwise stated, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. For example, unless otherwise indicated, method steps disclosed in the figures may be rearranged, combined, or divided without departing from the scope of the disclosed embodiments. Similarly, additional steps may be added or steps may be removed without departing from the scope of the disclosed embodiments. Thus, the materials, methods, and examples are illustrative only and are not intended to be limiting.

As used herein, an organization may pertain to a team within a company, a business unit within a company, a branch of a company, a location of a company (wherein the company has multiple locations), or any other organized body of individuals with a shared purpose and/or location.

Figure 1A:
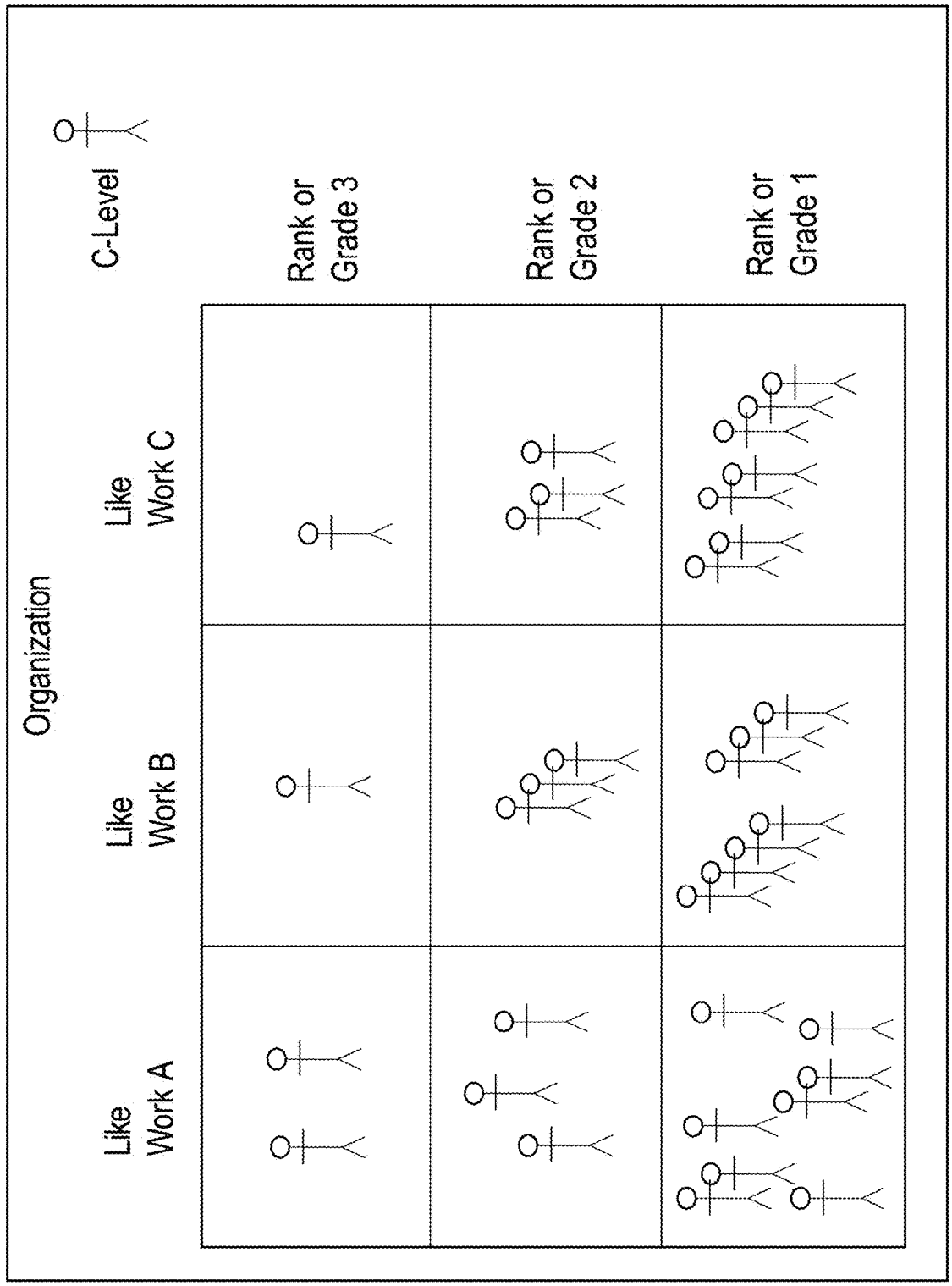
FIG. 1a presents a hypothetical scenario demonstrating an organization with people divided up into like work categories and pay grades where c-level at the top represents identified imbalances in career advancement for people working in similar jobs.

FIG. 1a presents a hypothetical scenario illustrating the concept of like-work, which is people working similar jobs all assigned a similar pay grade across the organization regardless of which sector of the organization they are working for. Employees in Grade 1 of Like-work A, B, and C are demonstrative of employees working in similar positions with similar pay across the organization. As some employees across the organization in Like-work A, B, and C advance to Grade 2 and 3 within their respective Like-work, they face imbalanced opportunities for career advancement.

Figure 1B:
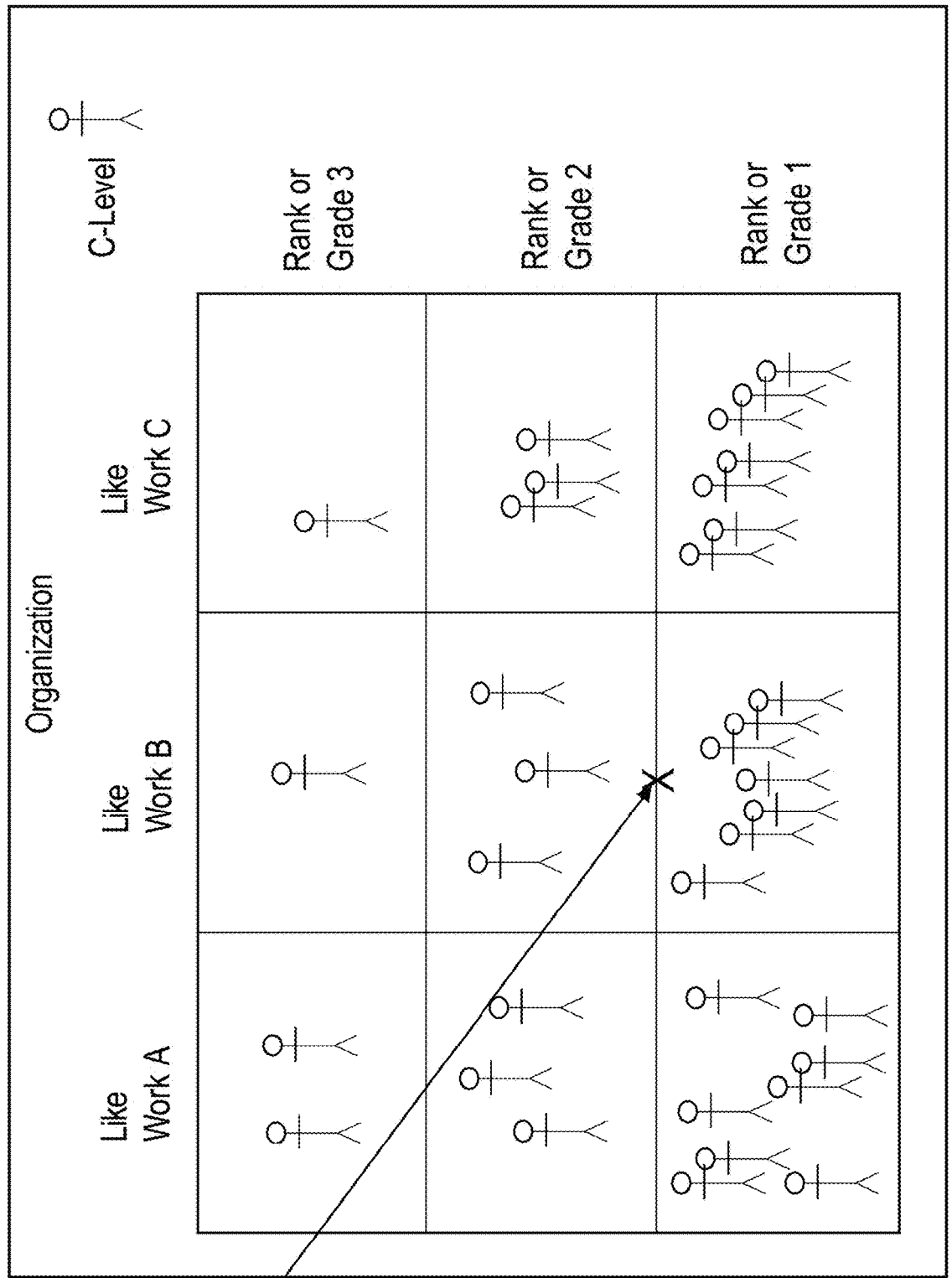
FIG. 1b Illustrates an organization's structural barrier to career advancement.

FIG. 1b represents unobservable organizational structural obstacles to career advancement. For example, a manager for Like-work A, B, or C at Level 1 may not require all his employees to complete development plans in a particular organization. This may lead only some employees in Like-work A, B, or C to develop a career development plan. This may lead to more promotions these employees, whereas if the managers for all Like-work had ensured their employees completed the development plan, this imbalance might not have occurred.

Figure 1C:
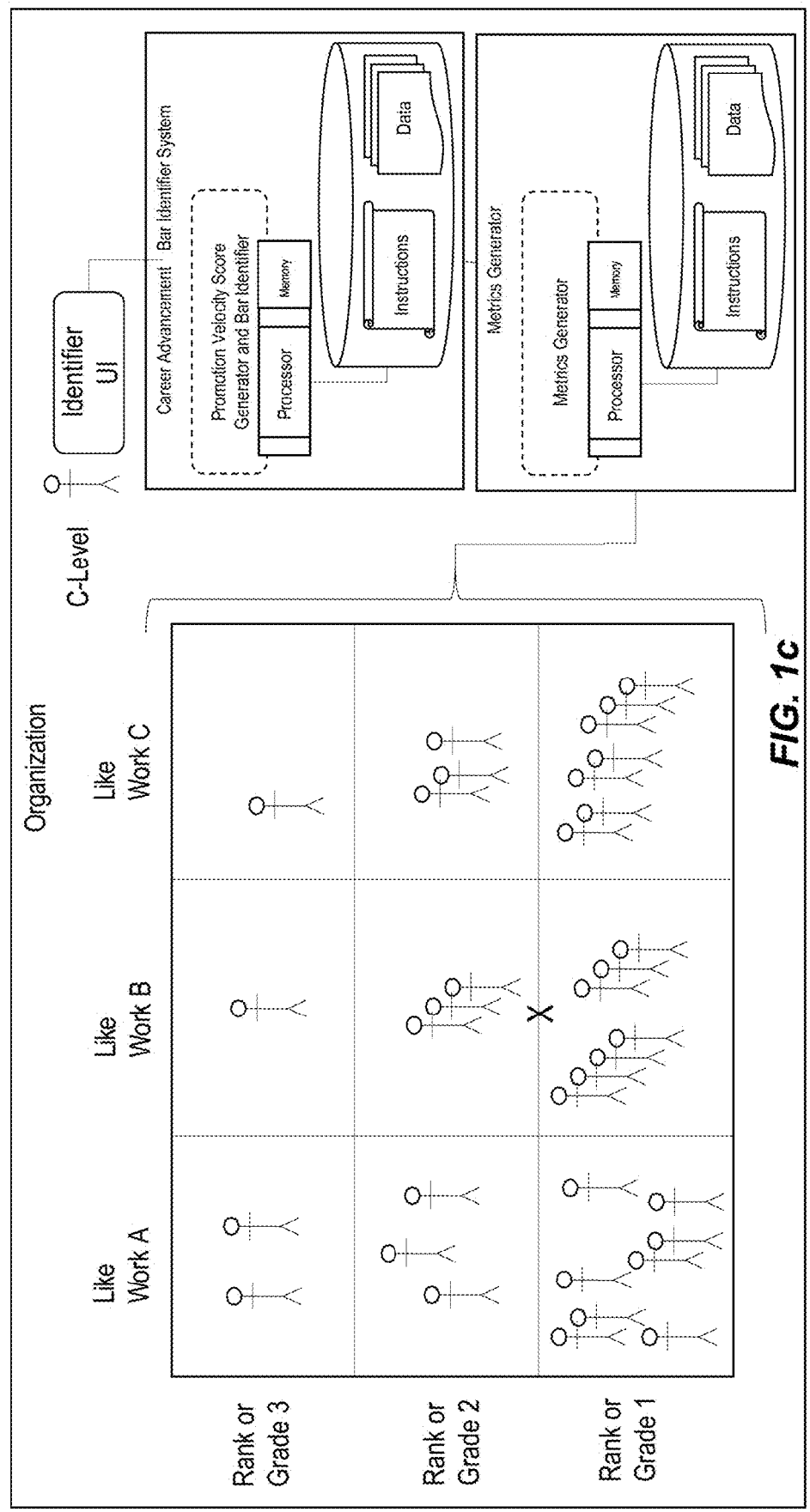
FIG. 1c Illustrates a technological solution to identifying these impediments to career advancement.

FIG. 1c Illustrates a technological solution to identifying these impediments to career advancement. This technological solution also validates corrective actions taken after the fact. FIG. 1c illustrates a system that reads data and generates metrics to facilitate the promotion velocity score and generating representation forecasts by identifying obstacles or bars to career advancements for higher levels career placements.

Figure 2:
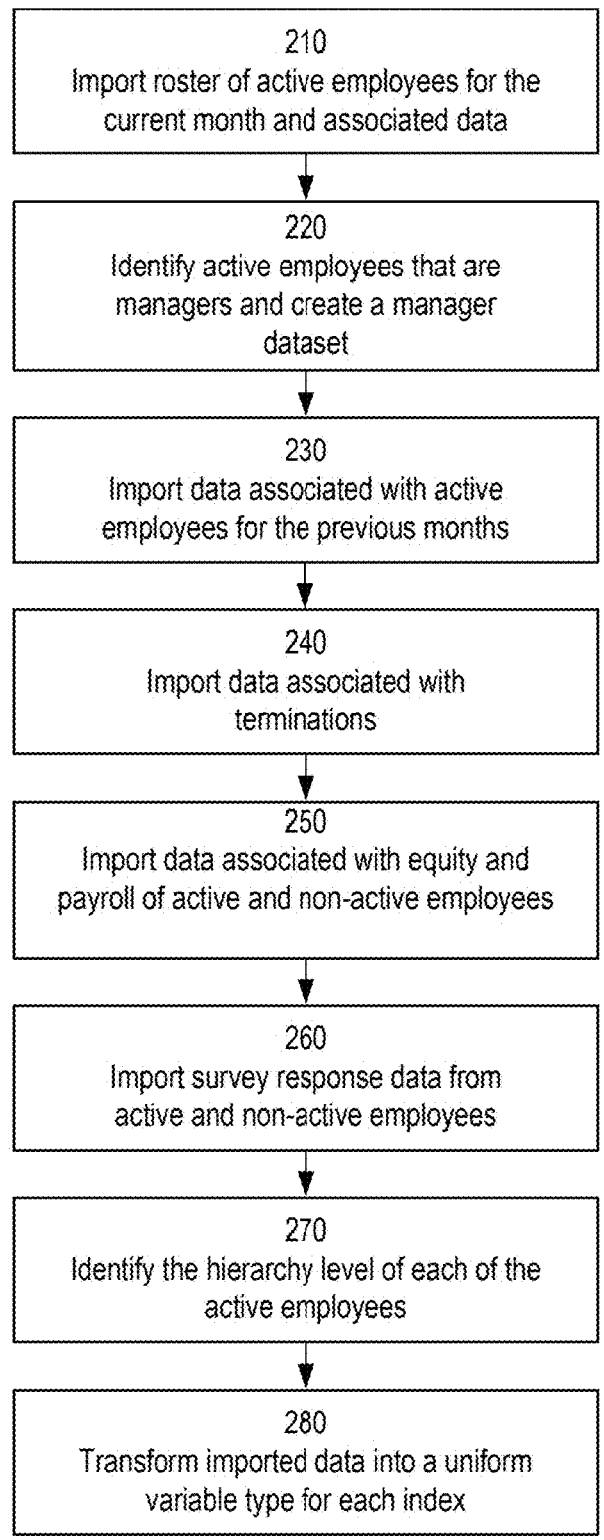
FIG. 2 presents a flowchart illustrating an exemplary method for transformation of data into indexes, according to embodiments of the present disclosure.

FIG. 2 presents a flowchart illustrating an exemplary method 200 for transformation of data including company or organizational information into indexes, according to embodiments of the present disclosure. The exemplary method for transformation of data into indexes may be stored as instructions in a non-transitory computer readable medium. The instructions may be executable by at least one processor for executing the transformation of data into indexes.

In step 210, the method 200 may include importing a roster of active employees for the current month and data associated with the active employees from at least one data source. An active employee may include a person currently employed by a company or organization and may be actively working and receiving compensation for their work. Data source may refer to company databases, websites, user input, company files, configuration management records and any other input source for data. The associated data may include, but is not limited to, the employee identification number (ID), job code, gender, age, person of color (POC) group, years in the job, position, career rank, current salary, previous salary, most recent annual review rating, previous annual review rating, incentive, equity, supervisor identification number (ID), date hired, location of office (zip code), location of home (zip code), and commute distance. A set of associated data may be imported for each active employee. Importing data for an active employee may refer to accessing or retrieving data from a storage device (e.g., the data source) into a system or application. The imported data for each active employee may then be used for analysis, reporting, or other purposes.

In step 220 the method 200 may include identifying active employees that are managers and a manager dataset may be created. A manager may be identified by data fields in the imported data that may indicate that the job role of the active employee may be associated with a manager position. The manager dataset may include, but is not limited to, information such as age, years in the job, years with the company, gender, and review rating.

In step 230, method 200 may include importing data associated with active employees for the previous months. This data may include information about the last job role each active employee held including, but is not limited to, previous job codes, previous career level, and previous supervisor identification number (ID). If the supervisor (or manager) or career level for an active employee changed between data associated with previous months and current data, categorical variables associated with a change in manager or change in career level may be changed. A categorical variable, as may be present in data from the at least one data source, may refer to a type of data that represents a set of categories or groups. In step 230, the categorical variables in the data may relate to information associated with the last job role of the active employee. The categorical variables may be binary, meaning the variables can store, or be assigned, a value of 0 or 1. It is to be appreciated that importing data in step 230 may be similar to importing data in step 210 (e.g., data may be imported from at least one data source as previously described).

In step 240, method 200 may include importing data associated with terminations of previously active employees. Termination of an employee may refer to the process of ending the employment of the employee with a company or organization. The data may include, but is not limited to, the type of termination, termination date, and termination description.

In step 250, method 200 may include importing data associated with equity and the payroll of active and non-active employees. Payroll data may include, but is not limited to, the salary, incentive (e.g., bonus), equity, and/or full or part-time status of an employee. Payroll data may be further used to compute pay equity. Equity for the employee may refer to stock, stock options or grants that the employee may be awarded by a company. An incentive or bonus for the employee may refer to a reward or additional compensation given to the employee for achieving certain goals or to reward good job performance.

In step 260, method 200 may include importing survey response data from active and non-active employees. The survey response data may include, but is not limited to, employee ratings or reviews of their perceived career growth, perceived manager interest in their career development, perceived recognition within the company, perceived respect within the company, and trust in their team or organization. The survey response data may be used to generate a net promoter score, where the net promoter score quantifies the engagement of the employee within the organization. In step 270, method 200 may include identifying the hierarchy level of each of the active employees. Hierarchy level in the organization may refer to the level of authority or seniority that the employee holds within the organizational structure of the company and in step 270, the level of each active employee may be identified.

In step 280, the imported data may be transformed into a uniform variable type for each index. The transforming may include assigning a binary value, 0 or 1, to a representative categorical variable for imported data designed to go into an index. For example, a change in an employee's manager within the past 3 months may be transformed into a categorical variable "manager_change_3mo" where the statement that the variable represents is true and thus the variable may be set to 1 ("manager_change_3mo=1"). The same process may be performed for the data associated with an index that represents recent career development changes of the employee. The index then may be generated by combining the categorical variables. In one embodiment, this combining may be performed by calculating the mean, or average, of the categorical variables. It is to be appreciated that any type of statistical calculation or numerical calculation may be used to perform the combining of categorical values. An index may be a composite statistic, or a measure of changes in a representative group of individual data points. An index may be a categorical, numerical, and/or ordinal value. Categorical indexes may be used to group data into specific categories or groups, such as by gender or race. Numerical indexes may be used to represent numerical values, such as by age or salary level. Ordinal indexes may be used to rank data in a specific order, such as a rating system for employee performance. Different types of indexes may be used to categorize or group data based on specific criteria or characteristics, numerical information and/or statistical data type.

Distilling data may refer to the process of analyzing and summarizing imported data to extract the relevant information. An example of distilling the data may be in transforming or translating data obtained from survey responses. The imported data may be numeric in nature, such as a number between 1 and 10. The data may be transformed into a categorical variable by identifying responses that are above a certain number as a 1. For example, an employee can rate their perceived recognition within the organization as a number between 0 and 10. If the employee rates their perceived recognition as 9 or 10, the associated categorical variable may be set to true, or 1 ("enps_recog_promoter=1"). If the employee rates their perceived recognition as 7 or 8, another categorical variable may instead be set to true, or 1 ("enps_recog_passive=1") If the employee rates their perceived recognition as 0, 1, 2, 3, 4, 5, or 6, a third categorical variable may instead be set to true, or 1 ("enps_recog_detractor=1"). For example, a certain numerical level may be established as a threshold, such as between 7 and 8. If the employee has rated their perceived recognition as a 9 (which is greater than 8), the categorical variable may be set to true, or 1. If the employee has rated their perceived recognition as a 6 (which is less than 7), the categorical value may be set to false, or 0. This transformation process may be performed for other survey responses and other imported data not listed. An index associated with the survey responses may be generated by combining the associated categorical variables. In one embodiment, this combining may be performed by calculating a mean, median or other type of statistical or numerical value, of the categorical variables.

Figure 3:
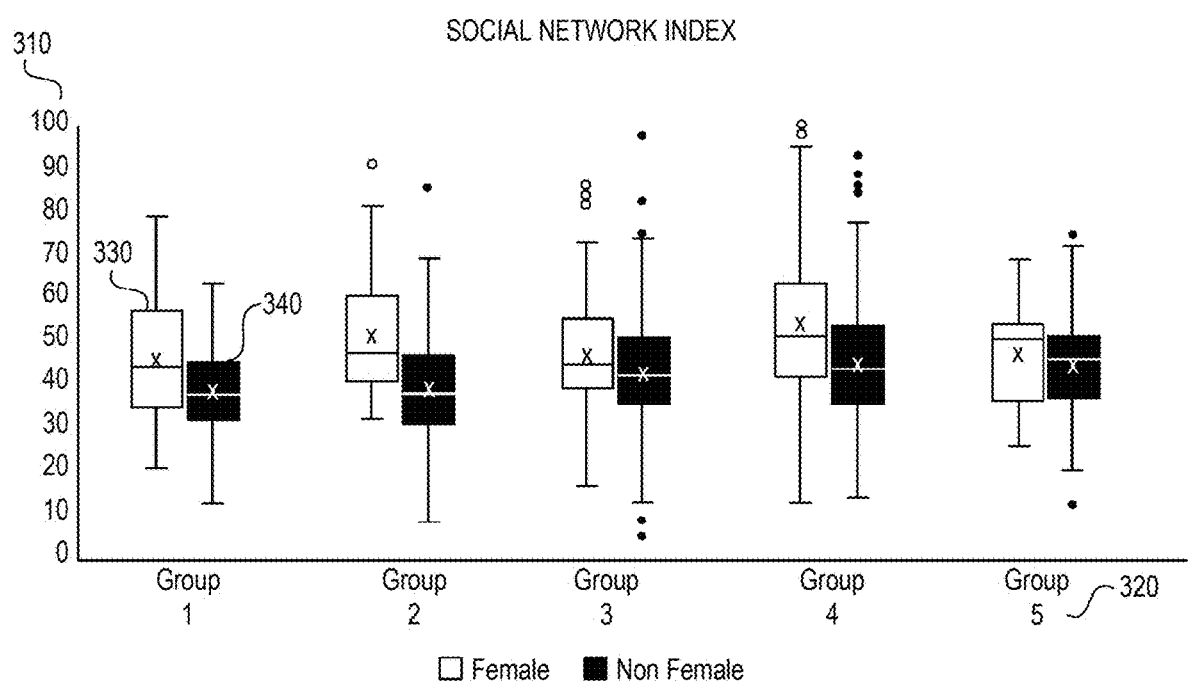
FIG. 3 illustrates an exemplary output of indexing in the form of a social network index, according to embodiments of the present disclosure.

FIG. 3 illustrates an example output of indexing in the form of a social network index 300, according to embodiments of the present disclosure. "Social network index" may generally refer to a measure of the level of social interaction and connectivity within a particular network or community. A social network index may be used to analyze the strength and diversity of relationships between individuals or groups, as well as to identify key influencers and trends within the network. Consistent with some disclosed embodiments, the social network index may be calculated by transforming imported data, such as the sender and recipients of internal correspondence (e.g., email, instant messaging). For example, in response to the sending of an email, one or more processors may assign a categorical variable of one, and the one or more processors may adjust a social network index value based on an aggregate of the categorical value associated with sending the email. As shown in FIG. 3, the social network index may be a numeric index 310 with a value between 0 and 100. The social network index number index 310 may correspond to an individual or a group 320. A lower value may indicate less social engagement and a higher value may indicate more social engagement. In FIG. 3, for each group 320 displayed, for example, "Group 1," subgroups may be presented that represent different groups within a demographic trait, such as female 330 and non-female 340, as shown. In other embodiments, the sub-groups may be based on ethnicity, such as African American, Asian, White, Hispanic, and Other. It is to be appreciated that groups may include, for example, family, friends, employees, neighbors, demographics, ethnicities, and/or any other grouping of people that may interact socially. Further, the social network index may be represented by a value calculated using mean, average, or any other statistical calculation.

Figure 4:
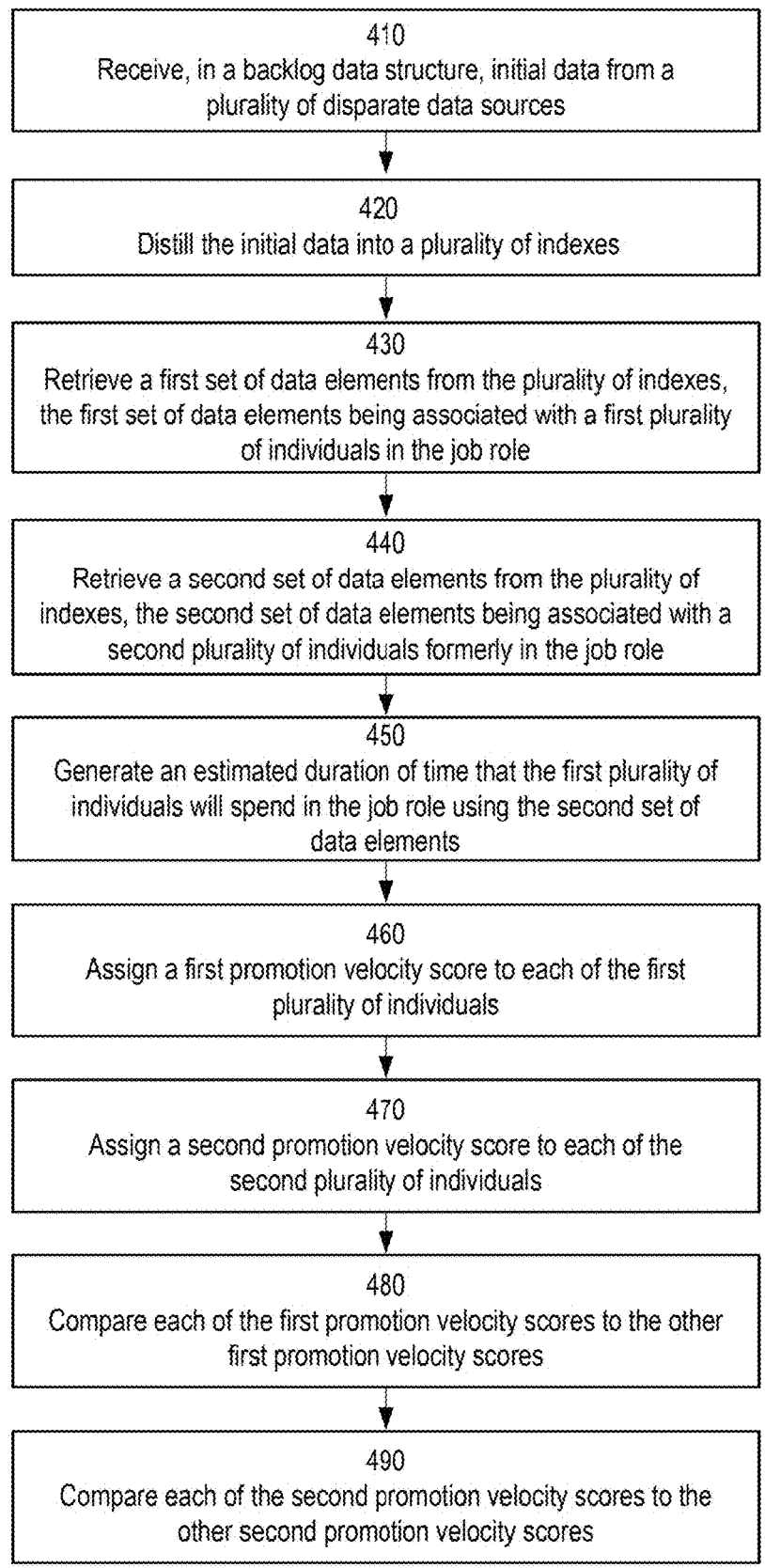
FIG. 4 presents a flowchart illustrating an exemplary method of determining the promotion velocity, according to embodiments of the present disclosure.

FIG. 4 presents a flowchart illustrating an exemplary method 400 of determining promotion velocity, according to embodiments of the present disclosure. Promotion velocity may refer to the rate at which employees are promoted to higher positions within a company or organization. By way of a non-limiting example, promotion velocity may be measured by the average time taken for an employee to be promoted or the percentage of employees who are promoted within a certain time frame. A promotion velocity algorithm may be stored as instructions in a non-transitory computer readable medium. The non-transitory computer readable medium storing instructions, that, when executed by at least one processor, cause the at least one processor to perform operations for executing the promotion velocity algorithm to perform operations for identifying and predicting inequality outcomes in a job role.

As shown in FIG. 4, method 400 may include a step 410 of receiving data from a plurality of disparate data sources, the data including a plurality of variables. As described previously, data sources may refer to company databases, websites, user input, company files, configuration management records and any other input source for data. Disparate data sources may refer to differences in characteristics of each of the data sources and the type of data that may be retrieved from each data source. For example, the data received from a plurality of disparate data sources may include correspondence data, survey response data, payroll data, and talent data. Correspondence data may include, for example, the sender and/or recipients of electronic mail (hereafter referred to as e-mail or email) correspondence. Correspondence data may further include the date and time that an email is sent and/or received. In some embodiments, correspondence data may also include the sender and/or recipients of instant messages. Correspondence data may be received from an email or messaging server. Survey response data may include, for example, employee responses to internal surveys. The responses may include rating on a scale what the employee thinks of their career growth opportunities, manager's interest in their career development, recognition within the organization or company, respect within the organization or company, and/or relationship with their organization. Survey response data may be received from user input or may be received as input from a company file where survey data may be maintained.

Elements of the received data may correspond to data types and variables associated with promotion velocity regarding the plurality of entities in a position. An element of received data may refer to a piece of information within a larger set of the received data. The element of the received data may be a variable or an object that holds a specific value or information. Data types may refer to the different categories of data that can be stored and used in a software application, for example, integer data, string data, Boolean data and binary data. A variable may generally refer to a value or data type that may change within the context of a specific element of data that the variable represents. Each variable of the plurality of variables may be associated with a data type and an entity of a total plurality of entities. For example, payroll data may include information (e.g., elements of payroll data) about the employee number, salary, tax information and other employment data related to an employee. Each element of payroll data for the employee may correspond to a variable (e.g., each element of payroll data may be a variable because it may take on different values for different employees). An entity may refer to a specific object or concept that may be represented in the data. For example, in a database of employee information, each employee may be considered an entity. Further, each object containing employee information may have a plurality of variables associated with the employee information. An entity in a position may refer to an employee in a particular job role. Promotion velocity regarding the plurality of entities in a position may refer to the rate at which employees are promoted to higher positions from the particular job role.

Method 400 may include a step 420 of distilling the data into a plurality of indexes to convert the data into the plurality of indexes to be usable by a single data structure. The data may be distilled by assigning a binary value to each variable of the plurality of variables, wherein each variable is a categorical value, a numerical value, or an ordinal value. An index may be generated using the binary value of each variable for each data type and each entity of the total plurality of entities. Each index may be stored in a database. The distillation may include importing the data in its original type. The original type of the data may be different for the different information included in the data. In some disclosed embodiments, the type of data may be talent data. Talent data may include information associated with employees in a job role such as the career rank, hire date, location, duration of time in the job role, and demographic traits. The talent data may include different types such as categorical (or nominal), ordinal, or numeric. The talent data may include information of each type. For example, the demographic traits may be categorical, the career rank may be ordinal, and the duration of time in the job role may be numeric. The distillation may include reading the data and translating, or transforming, the information in the data into one uniform type. Uniform type may refer to a data type where all elements within the data set are the same data type. Continuing with the previous example, the demographic traits and career rank of an employee may be translated, or transformed, into a numeric type. As a result, the demographic traits, career rank, and duration of time in the job role may become one uniform type, numerical. Then, an index, or composite indicator, may be assigned to the talent data of the employee based on a mathematical transformation, such as a mean, average or any type of statistical calculation or numerical calculation that may be used to perform the mathematical transformation of the translated or transformed demographic traits, career rank, and duration of time in the job role.

Figure 13:
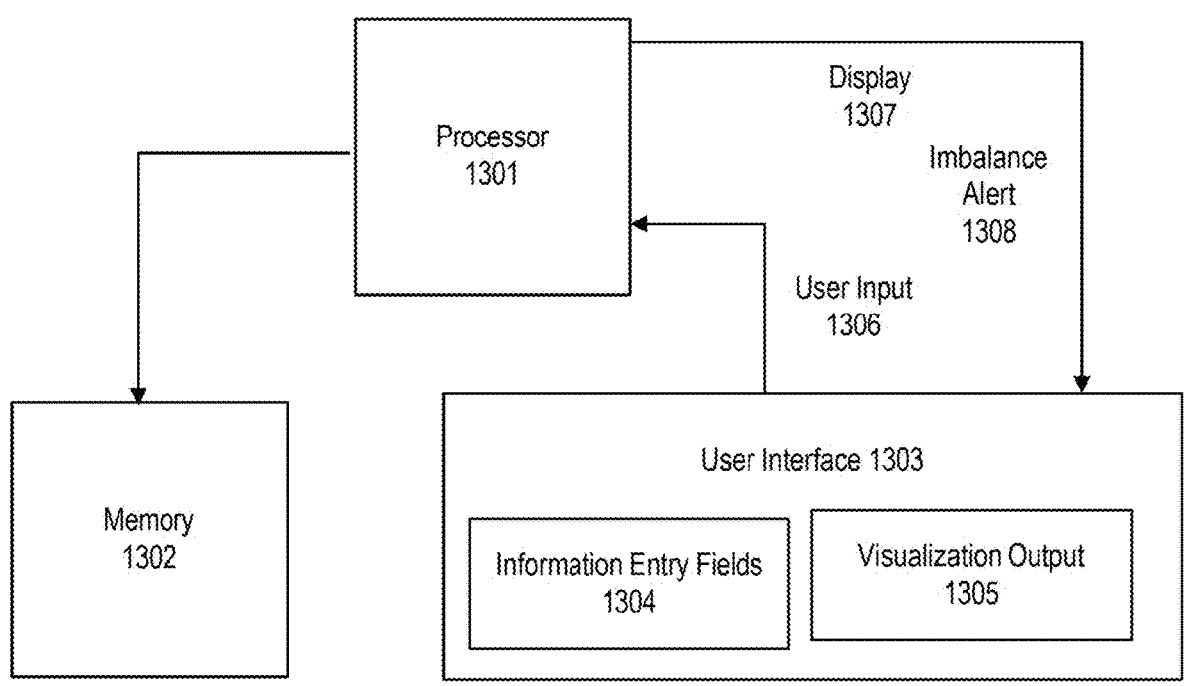
FIG. 13 illustrates an example of a system configured to perform functions of the disclosed embodiments.

Step 420 may improve computer performance speed because processor 1201, as shown in FIG. 13, need not access multiple data structures. Instead, the plurality of indexes created by step 420 may be usable by a single data structure. Therefore, processor 1301 may only need to access a single data structure instead of multiple data structures. Accessing data structures may involve accessing buffers in memory 1302. Computer performance speed may relate to the amount of buffers processor 1301 needs to access in memory 1302. Therefore, step 420 may improve computer performance speed because step 420 may allow for processor 1301 to access fewer buffers in memory 1302.

Furthermore, step 420 may improve computer performance by conserving computer memory in memory 1302, shown in FIG. 13. The step 420 may allow for the data to be saved in memory 1302 in the form of indexes, rather than in the data's initial form. Storing the data in the form of indexes may require less memory, and therefore, storing data in the form of indexes may conserve memory. Accordingly, step 420 may improve computer performance speed.

As shown in FIG. 4, method 400 may include a step 430 of retrieving a first set of data elements from the plurality of indexes. Retrieving, as in retrieving data, may refer to accessing or reading stored information from a memory (e.g., database, server, RAM and any other storage medium). The first set of data elements may be associated with a first plurality of entities of the total plurality of entities. In some embodiments, the first plurality of entities of the total plurality of entities may include individuals in a job role. The first set of data elements may include, but is not limited to, information associated with an actual duration of time in the job role and one or more demographic traits. The demographic traits may refer to characteristics of a population including age, gender, ethnicity, education level, income, occupation, cultural background or other identifying features of a group of people. The first plurality of individuals may be current employees who are still in the job role.

As shown in FIG. 4, method 400 may further include a step 440 of retrieving a second set of data elements from the plurality of indexes. The second set of data elements may be associated with a second plurality of entities of the total plurality of entities. In some embodiments, the second plurality of entities of the total plurality of entities may include individuals in a job role. The second set of data elements may further include information associated with an actual duration of time in the job role and one or more demographic traits. The second plurality of individuals may be current employees who were promoted and are no longer in the job role.

Method 400 may include a step 450 of generating a predicted duration of time that the first plurality of entities may remain in the first position, as shown in FIG. 4. The first position may include, but is not limited to, the job role. The predicted duration of time may be generated by using the second set of data elements associated with the second plurality of entities. The second plurality of entities may include the second plurality of individuals. For example, the average duration of time that the second plurality of individuals, who were formerly in the job role, spent in the job role may be used as the estimated duration of time that the first plurality of the individuals who are currently in the job role will spend in said role. In another embodiment, the estimated duration of time may be calculated by a weighted average that includes the actual duration of time that the second plurality of individuals were in the job role and one or more other factors, such as whether each of the second plurality of individuals were terminated, promoted, or had some other change to their position within the company.

As shown in FIG. 4, method 400 may include a step 460, where a first velocity index may be assigned to each of the first plurality of entities to obtain a plurality of first velocity indexes. A velocity index may refer to a metric used to measure the speed and efficiency of career advancement for an employee within a company. A metric may refer to a quantitative measure used to assess or evaluate a particular aspect of a system or process. Consistent with some disclosed embodiments, velocity indexes may be used in determining promotion velocity for a plurality of entities. The first velocity index may be directly proportional to a measure of closeness between the predicted duration and the actual duration of time in the position in the first set of data elements. For example, the first velocity index of step 460 may be directly proportional to the difference between the estimated duration and actual duration of time spent in a particular position in the first set of data elements. In another example, the velocity index may be a calculated residual of, or difference between, the predicted, or estimated, duration of time in a position (e.g., job role) and the actual duration of time in the position. In some embodiments, the operations may be performed for a plurality of positions. As shown in FIG. 4, method 400 may include a step 470, where a second velocity index may be assigned to each of the second plurality of entities to obtain a second plurality of second velocity indexes. The second velocity index may be directly proportional to a measure of closeness between the predicted duration and actual duration of time in the position in the second set of data elements. The second velocity index may be calculated in a manner similar to that described above for the first velocity index.

As shown in FIG. 4, method 400 may include a step 480 of comparing each of the first velocity indexes to other first velocity indexes from among the plurality of first velocity indexes. The comparing of first velocity indexes may include identifying differences between each of the first velocity indexes and identifying information associated with a data category of each of the first plurality of entities. For example, a difference between a first velocity index and the average of the first velocity index may be calculated. This difference may be used to identify first velocity indexes that are greater than a specified, predetermined amount. The corresponding data categories (e.g., demographic traits, such as gender or ethnicity) can be identified. In one example, the data category may be associated with one or more demographic traits of each individual of a group of individuals. Identifying the information associated with the demographic traits may involve comparing promotion velocities of the individuals in the group and determining if there may be differences in promotion velocities of the individuals based on different demographic traits.

In some embodiments, the first velocity indexes may be separated into two groups where one group includes the first velocity indexes associated with one category of demographic trait and a second group includes the first velocity indexes associated with a second category of demographic trait. For example, the demographic traits may be gender. A first group of velocity indexes may be created based on the associated female demographic trait. A second group of velocity indexes may be created based on the associated non-female demographic trait. The median of the first group of velocity indexes and the mean of the second group of velocity indexes may be calculated. The medians may be compared to assess a gap, or difference, between the two. The gap may identify where promotion velocities differ based on demographic traits. This may identify where a lack of opportunity, or broken rung, may be occurring. In another embodiment, the demographic trait can be ethnicity.

As shown in FIG. 4, method 400 may include a step 490 of comparing each of the second velocity indexes to other second velocity indexes from among the plurality of second velocity indexes. The comparing of second velocity indexes may be performed in a manner similar to that described above with respect to comparing of the first velocity indexes. Based on the first plurality of velocity indexes and the second plurality of velocity indexes, a velocity model may be generated. A velocity model for promotion velocity may include a mathematical model that predicts the rate at which employees may be promoted within a company. The velocity model may be used to identify high-potential employees and to develop strategies for career advancement of those employees.

The operations may further include creating a distribution of the velocity indexes. Creating a distribution refers to organizing and displaying data in a way that shows the frequency or probability of different values. In some disclosed embodiments, the distribution may be created based on a plurality of velocity indexes. For example, the distribution of the velocity indexes may be created for the job role. The distribution may include the first and second velocity indexes. The operations may further include generating a score associated with an expectation that one or more entities in the first plurality of entities will move from their current position (e.g., current job role) to another position (e.g., a new job role code). The score may be generated based on a plurality of contributing factors associated with a determination of whether one or more entities may be likely to move to another position, and based on the contributing factors, calculate an estimate of likelihood of the entity moving to another position. In some embodiments, the score may be calculated as a number, probability, rating or similar metric representing likelihood of an entity changing position. Using the score, a quantity of a projected first plurality of entities in the position over a duration of time may be generated. The velocity indexes may be used to estimate a probability that one or more individuals in the first plurality of individuals will be promoted. For example, a positive velocity index may be indicative of a higher probability that an individual will be promoted. A velocity index that is higher than another velocity index (for example, 1.7 and 1.0) may be indicative of a higher probability that an individual will be promoted. The velocity index may measure the rate at which employees are promoted within a company or organization and thus a higher velocity index refers to a higher rate or probability of promotion within the company or organization. Thus, in some embodiments, a value of the velocity index may be directly proportionate to a likelihood of a promotion.

The operations may further include generating a graphical user interface containing information entry fields for receiving user input regarding input parameters. Receiving user input may refer to accepting and processing user entry through an interface (e.g., a graphical user interface), on a computer, mobile device or other device that may accept user data entry. The user input may include text, numbers, selections, and other types of data. The user input may be provided using one or more of a keyboard, a mouse, buttons, levers, switches, checkboxes, pulldown menus, touchscreens and any other data entry method via a graphical user interface. The graphical user interface may allow user input regarding input parameters associated with promotion velocity. In some embodiments, the graphical user interface may be provided for display on a user device. The input parameters received in the entry fields of the graphical user interface may define the data to be used to calculate the velocity indexes. For example, entry fields may allow user input to be received that identifies the first set of data elements and the second set of data elements to use to calculate the velocity indexes. In one example, a user input may identify a specific demographic trait, such as described in a previous example, the first set of data elements may be associated with a first demographic trait (e.g., female) and the second set of data elements may be associated with a second demographic trait (e.g., non-female). The operations may further include receiving, from the graphical user interface via the user device, one or more input parameters and generating a second projected first plurality of entities in the position over the duration of time based on the one or more input parameters. In some disclosed embodiments, entry at the graphical user interface may allow user input of input parameters to cause a prediction of the entities in a position over a period of time. Returning to the example of input parameters relating to demographic traits, the first set of data elements that may be selected by input parameters entered by the user may be associated with the first demographic trait (e.g., education level, for example college educated individuals). An additional input parameter that may be selected by input parameters entered by the user may initiate an analysis for projecting the number of entities with the first demographic trait that may be in the position after the period of time (e.g., prediction of promotion velocity for college educated individuals in the first set of data elements). Thus, the input parameters may be used to set up an analysis of promotion velocity based on the specific individual or groups that the user may intend to analyze or compare, by allowing the user to select the first set of data elements and the second set of data elements to perform the analysis.

By way of a non-limiting example, an expected diversity of a projected first plurality of entities in the job role over a duration of time may be generated. The expected diversity may refer to the level of variation in terms of demographics, skills, experiences, and perspectives among employees that an organization aims to achieve. The expected diversity may be determined by generating a velocity model for the plurality of entities in the job role and using the generated velocity model to predict the future level of variation of the plurality of entities in the job role over a duration in time. The expected diversity may be based on several factors such as gender, race, ethnicity, age, education, and cultural background. The probability that one or more entities in the first plurality of entities will be promoted may be used to predict the plurality of entities in different job roles in the future (e.g., the level of variation of employees) and thus allow for a determination of the expected diversity. The expected diversity may be used to determine an expected level of variation of the job role in a specified duration of time and may allow for an evaluation of whether the expected diversity may achieve organization goals for diversity in the job role or not. For example, if the organization goals for diversity are met, as shown by the prediction of expected diversity, the expected diversity of a plurality of entities in a job role may be evaluated under different conditions by removing the data of the entities who have a velocity index over a certain threshold. The demographic data of the remaining entities may be used to generate expected diversity that meets the goals of the organization.

In some embodiments, the operation of predicting how many individuals will be promoted and no longer in the job role may be implemented using a machine learning model. The data retrieved in step 440, which is associated with a second plurality of individuals formerly in the job role, may be used as training data to train a machine learning model. A machine learning model may be trained by providing it with a large dataset of labeled examples from received data from company data sources. The received data may have been distilled into a plurality of indexes. It is to be appreciated that the machine learning model may be trained on the received data, distilled data or any other imported data. The training of the machine learning model may be based on using an algorithm to adjust the parameters of the model until the model can accurately predict the most appropriate output for new, unseen received data (e.g., imported data from the data sources). For example, such a machine learning model may be used to predict how many individuals who are currently in the job role will be promoted. The machine learning model may be trained on a dataset of examples associated with job role data where, consistent with some disclosed embodiments, the most appropriate output may be a velocity index or a velocity model based on input data related to job role.

FIG. 13 illustrates an example of a system diagram configured to perform functions of the disclosed embodiments. In some disclosed embodiments, the operations may include a user interface 1303 (e.g., graphical user interface) including information entry fields 1304 for receiving user input regarding diversity input parameters. Diversity input parameters may refer to input received in the entry fields of the user interface that may define the data to be used to calculate the expected diversity. For example, diversity input parameters may include parameters that may be entered related to target expected diversity goals such as the desired mix by gender, ethnicity, cultural, education level and any other characteristic that an organization may determine may be representative of diversity. The operations may include receiving from the user interface 1303 one or more diversity input parameters. The operations may further include generating a second expected diversity of the first plurality of entities in the job role over a duration of time based on the one or more diversity input parameters. Generating the expected diversity may include calculating the level of variation (e.g., statistical variation) between the first and second plurality of entities over a period of time. The one or more diversity input parameters may change the expected diversity of hiring, change the expected diversity of promotion, or change the expected diversity of retention. Changing the expected diversity of hiring may include changing the distribution of a certain demographic trait in entities to be added to the first plurality of entities in the second expected diversity. Changing the expected diversity of promotion may include changing the distribution of a certain demographic trait in individuals to be removed from the first plurality of entities in the second expected diversity. Changing the expected diversity of retention may include changing the distribution of a certain demographic trait in the first plurality of entities. The operations may further be performed for a plurality of job roles. It is to be appreciated that changing the diversity input parameters may change the variation in the expected diversity and as such, the user may adjust diversity input parameters to generate different predicted results to determine approaches to achieve company objectives, for example in hiring, promotion and retention.

Figure 5:
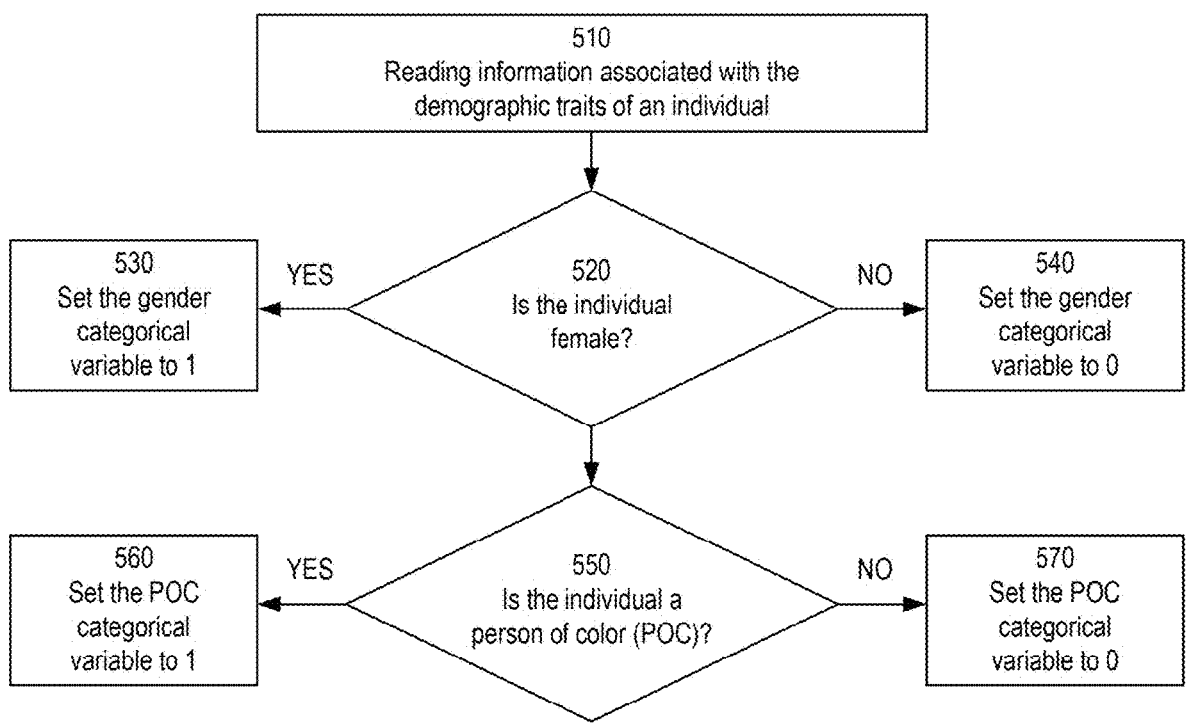
FIG. 5 presents a flowchart illustrating an exemplary method of identifying differences in demographic traits, according to embodiments of the present disclosure.

FIG. 5 presents a flowchart illustrating an exemplary method 500 of identifying differences in demographic traits, according to embodiments of the present disclosure. Method 500, as shown in FIG. 5, may be a form of distilling or transforming initial qualitative data into categorical values in a categorical variable that may further be distilled in an index to be usable by a single data structure. Information from a set of data associated with the demographic traits of an individual, or employee, may be imported from data sources as previously described and exemplified in this disclosure.

Method 500 may include a step 510 of reading information associated with the demographic traits of an individual. In one exemplary embodiment, the information may be the gender or ethnicity of the individual. As shown in FIG. 5, method 500 may include a step 520 where the qualitative value of the input information is evaluated. The qualitative values of information associated with gender may be female, male, non-binary, or the like. The qualitative values of information associated with ethnicity may be African American, Asian, Hispanic, White, or the like. For example, method 500 may include an output 530 where a gender categorical variable may be set to 1 if, while reading the information, it is determined that an individual is female. Further, method 500 may include an output 540, where a gender categorical variable may be set to 0 if it is determined that an individual is not female. Furthermore, method 500 may include a step 550, where, if while reading the information it is determined that an individual is a person of color (POC), then method 500 may include an output 560 where a POC categorical variable may be set to 1. If it is determined that an individual is not a person of color, then method 500 may include an output 570 where the POC categorical variable may be set to 0.

FIG. 6A illustrates an example of calculated promotion velocity medians of different demographic groups in promotion velocity table 600 using the promotion velocity algorithms described, according to embodiments of the present disclosure. In the promotion velocity table 600, promotion velocity mean may refer to the statistical measure that represents the middle value of years to promotion. As shown in FIG. 6A, columns and headings may be presented in an output. The columns may include Career 605 including "Career Level," "Job Family," and "Group Name," Headcount 610 including "Headcount totals," and Median Years to Promotion 615 including "Median Years to Promotion," and "Difference from Expected." Career Level may describe the hierarchy of a job family. Job Family may describe the general classification of the type of job role. Examples of job families may be Operations or Technology, as shown in FIG. 6A. Group Name may describe the group or team.

Headcount 610 may describe the distribution of individuals having a certain demographic trait. Headcount may include columns delineating the total number of individuals included in a certain category or row, the number of individuals who are people of color (POC) in a certain category or row, and the number of individuals who are not people of color (Non POC) in a certain category or row.

Median Years to Promotion 615 may describe a general group of columns that show the median years to promotion of individuals in a job role. The Difference from Expected may describe the difference calculated between the median years to promotion of a group of individuals and the expected median years to promotion of an individual in a certain row. The Difference from Expected may include three columns describing the difference calculated between the median years to promotion of different demographic groups and a gap between the calculated difference from expected of the demographic groups. As shown in FIG. 6A, the demographic groups may be POC and Non POC.

In FIG. 6A, the expected median years to promotion may be determined by taking the average of the actual duration of time individuals who were previously in the job role (and promoted) spent in the job role. As shown in FIG. 6A, the promotion velocity may be positive and/or negative values. Furthermore, a gap between different demographic groups (in this example, POC and Non POC) may be calculated. This gap may identify organizations or job families where the equity between different demographic groups may be lacking. For example, as shown in the second row Technology job family, a gap of −1.05 between the POC and Non POC group may be indicative of a systemic bias that affects the professional development and advancement of employees who identify with a minority demographic group within the job family. In other embodiments, the output may show differences and gaps between other demographic groups, such as female and non-female. In other embodiments, the promotion velocity may show mean years to promotion.

FIG. 6B illustrates an example of a calculated time in a career level 630 of different demographic groups, according to embodiments of the present disclosure. As shown in FIG. 6B, columns and headings presented in the output may include columns and headings previously discussed with respect to FIG. 6A, but with respect to Median Years in Career Level 620. The Median Years in Career Level 620 may describe the difference between the median actual duration of time a plurality of individuals spends in a career level compared to the expected (e.g., average or median of the estimated years to promotion). The output is similar to that of the promotion velocity shown in FIG. 6A. The expected time in a career level can be calculated in a manner similar to that of step 450 shown in FIG. 4. The median years that individuals in a career level that identify with a certain demographic group may be calculated. In other embodiments, the mean may be calculated and shown in the output. A gap between median years, or duration of time spent in a career level, of different demographic groups may be determined by calculating the difference between the duration of time each individual has spent in a career level and the expected duration of time an individual will spend in the career level. For example, as shown in the fifth row of FIG. 6B, the gap between median years in a career level for Female and Non Female individuals in a Technology job family is calculated to be 1.8. This may show that individuals who identify as female in the Technology job family represented in the fifth row spend on average 1.8 more years in the role compared to individuals who do not identify as females. The gap may be indicative of systemic bias in a job family, organization, and/or company as the professional development and advancement of individuals who belong to a minority group may be negatively impacted by this systemic bias.

Figure 7:
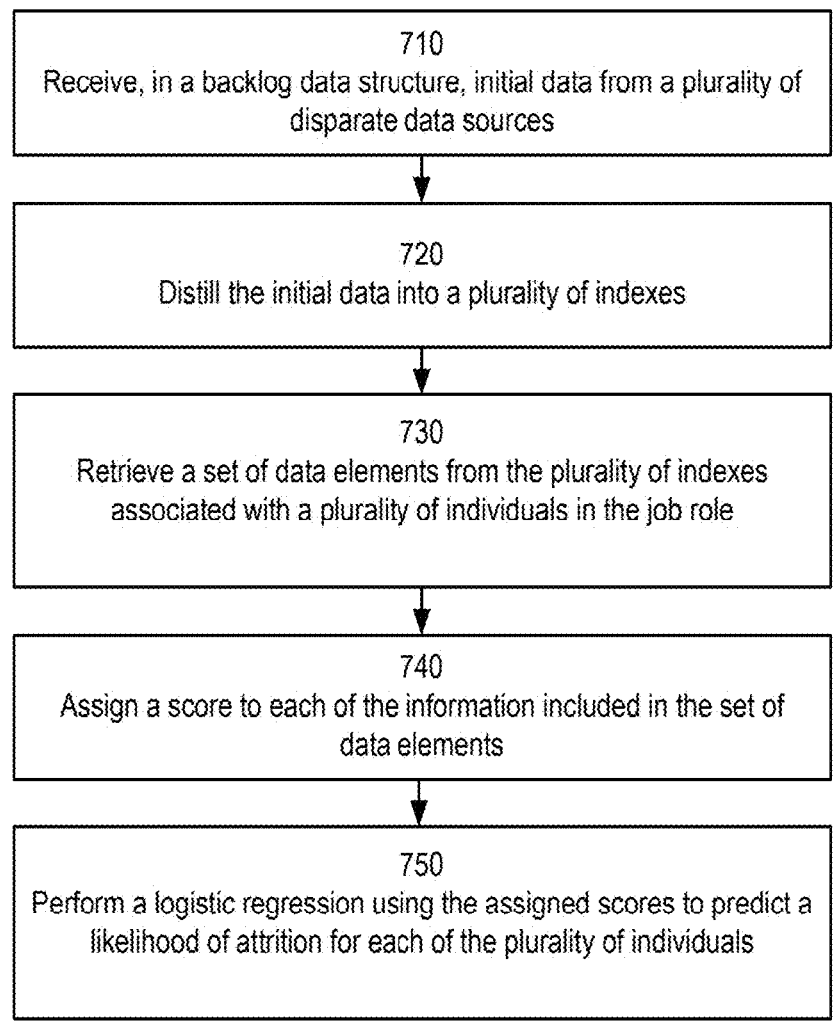
FIG. 7 presents a flowchart illustrating an exemplary method for determining a likelihood of attrition, according to embodiments of the present disclosure.

FIG. 7 presents a flowchart illustrating an exemplary method for determining a likelihood of attrition, according to embodiment of the present disclosure. The attrition model algorithm may be stored as instructions in a non-transitory computer readable medium. The non-transitory computer readable medium may include at least one processor that executes the attrition model algorithm to predict attrition of employees in a job role.

As shown in FIG. 7, method 700 may include step 710 of receiving data from a plurality of disparate data sources, the data including a plurality of variables associated with attrition. Attrition may refer to the rate at which employees leave or are terminated from their positions. Attrition may be measured as a percentage of the number of employees who leave the company within a certain time period versus the total number of employees. For example, the data received from the plurality of disparate data sources may include correspondence data, survey response data, payroll data, and talent data. The data may include a plurality of variables, each variable of the plurality of variables may be associated with a data type and an entity of a plurality of entities in a position. Elements of the received data may correspond to data types and variables associated with attrition regarding the plurality of entities in a position.

Method 700 may further comprise step 720 of distilling the data into a plurality of indexes to convert the data into the plurality of indexes to be usable by a single data structure, shown in FIG. 7. The data may be distilled by assigning a binary value to each variable of the plurality of variables, wherein each variable is a categorical value, a numerical value, or an ordinal value, by generating, using the binary value of each variable, an index for each data type and each entity of the total plurality of entities and by storing each index in a database. Details explaining the distilling and converting of the data are described and exemplified in step 420 of method 400. Step 720 may improve computer performance speed because processor 1301, as shown in FIG. 13, may only need to access the indexes in a single data structure. The details of how step 720 may improve computer performance speed are described and exemplified elsewhere in this disclosure. Furthermore, step 720 may improve computer performance by conserving computer memory in memory 1302, shown in FIG. 13. Details of how step 720 conserves computer memory are described and exemplified elsewhere in this disclosure.

As shown in FIG. 7, method 700 may include a step 730 of retrieving a set of data elements from the plurality of indexes. The set of data elements may be associated with the plurality of entities, for example the plurality of individuals in the job role. The set of data elements may include information associated with at least one of tenure, years in the job role, age, commute distance, performance, and payroll. Tenure may refer to the duration of time an individual has spent working in a company. Years in the job role may refer to the duration of time an individual has spent working in a specific job role, whether that is their current job role or past job role. Age may refer to the age, in years, of an individual. Commute distance may refer to the distance an individual must travel to get to work, or their office, in miles. Performance may refer to qualitative and quantitative assessments of their work performance. Payroll information may refer to an individual's salary, equity, and incentive (or bonus).

As shown in FIG. 7, method 700 may include step 740 of assigning an attrition index to each of the information included in the set of data elements. Attrition index may refer to metrics used to measure the rate at which employees leave or are terminated from their positions within the company. Examples of metrics that may be used to determine an attrition index may include the number of employees who have left the company, the reasons for their departure and the length of time they were employed. The attrition index may be determined from metrics that may be binary in nature, such as a 0 or 1 (e.g., false or true). For example, the information associated with performance may be transformed from a qualitative value into a categorical value. Performance values may include Exceeds Expectations, Meets All Expectations, Meets Some Expectations, and Too New to Rate. If the qualitative performance value is Exceeds Expectations or Meets All Expectations, an associated performance categorical variable may be assigned the value 1. If the qualitative performance value is Meets Some Expectations or Too New to Rate, the performance categorical variable may be assigned the value 0.

As shown in FIG. 7, method 700 may include step 750 of predicting, using the attrition index, attrition for each entity of the plurality of entities. Attrition may be a binary event. For example, the likelihood of attrition may be a binary event or outcome, where 1 indicates attrition is likely. Thus, based on the values of the metrics associated with the attrition index, an algorithm may be used to predict attrition for a plurality of entities. In one example, the entities may be individuals in a particular job role and the prediction may be the level of attrition (e.g., the percentage of employees that may leave the job role versus the total number of employees in the job role).

In some embodiments, step 750 may be used to implement a machine learning model. The data retrieved in step 730 that is associated with a plurality of entities (e.g., individuals in the job role) may be used as training data to train a machine learning model. Such a machine learning model may be used to perform step 750, where a prediction, using the attrition index, may be used to predict the likelihood of attrition. The machine learning model may be trained on a training dataset, including with attrition data and metrics data associated with the attrition index together with an associated rate of attrition. The trained machine learning model may be configured to predict the rate of attrition when provided with inputs including attrition data and metrics data associated with the attrition index.

The operations may further include creating a distribution of attrition for the position (e.g., job role). The distribution may use the attrition of each entity of a plurality of entities. The distribution may include the attrition indexes. The operations may further include generating, using the distribution, a quantity of a projected plurality of entities in the position over a duration of time. The operations may further include generating a visualization of the distribution.

The operations may further include generating a graphical user interface containing information entry fields for receiving user input regarding input parameters. The input parameters received in the entry fields of the graphical user interface may define the data to be used to calculate attrition index and/or attrition. The graphical user interface may allow user input regarding input parameters associated with attrition. In some embodiments, the graphical user interface may be provided for display on a user device. The operations may further include receiving, from the graphical user interface via the user device, one or more input parameters and generating a second projected first plurality of entities in the position over the duration of time based on the one or more input parameters. In some disclosed embodiments, at least one processor may receive, via input by the user, one or more input parameters such as gender, age, location of employment, job role and other characteristics to determine the set of data elements to analyze. The disclosed system may use these input parameters to recalculate a prediction of the attrition rate for each entity over a period of time. Thus, by providing different input parameters, the user of the disclosed system may be able to evaluate the effect of the input parameters on the predicted attrition rate.

Figure 8:
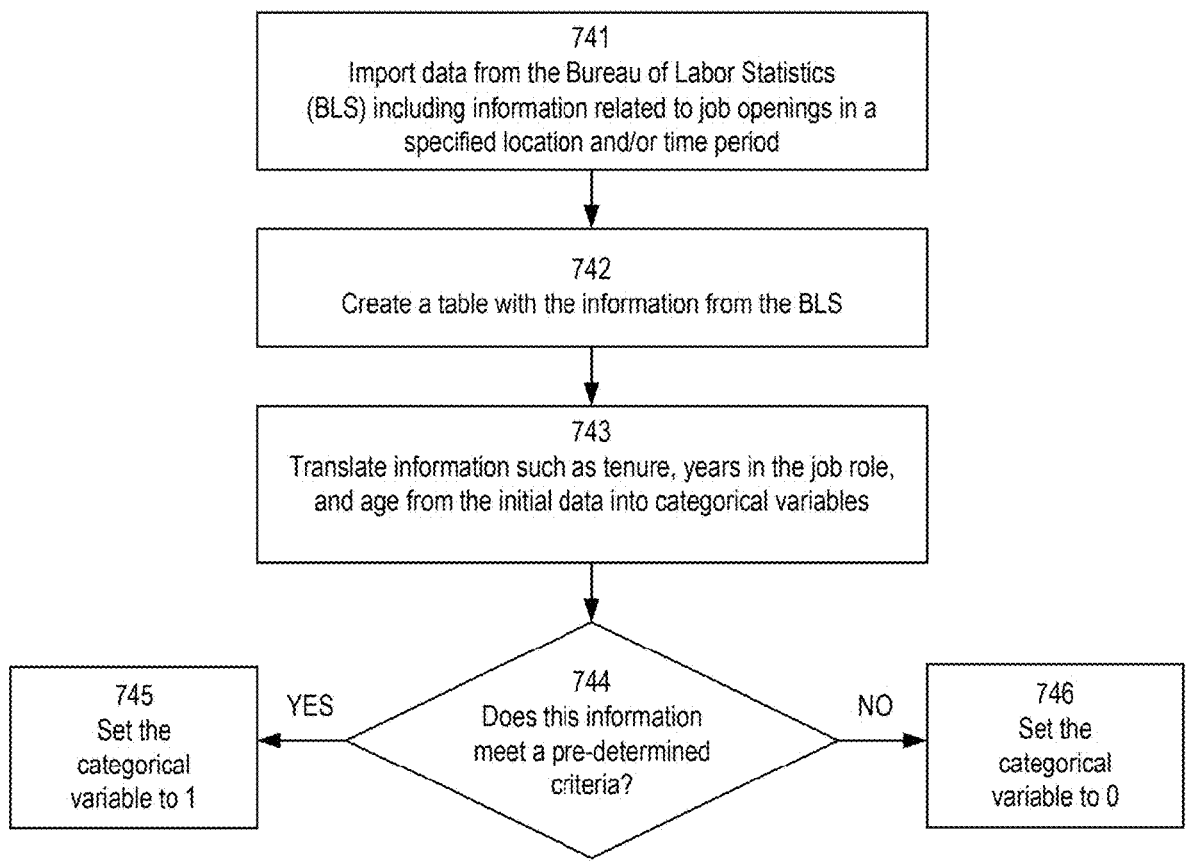
FIG. 8 presents a flowchart illustrating an exemplary process of assigning a score, as shown in FIG. 7, according to embodiments of the present disclosure.

FIG. 8 presents a flowchart describing method 740, which may include an exemplary process for the assignment step 740 of FIG. 7. Method 740 may include step 741 of importing data from the Bureau of Labor Statistics (BLS). The data may include information related to job openings in a specified location and/or period of time. Method 740 may also include step 742, where a table is created with the BLS data. The table may include information on labor economics and statistics, such as data on employment, wages, productivity, and occupational safety and health, that may be used in determining the likelihood of attrition. The BLS data may be used to determine the likelihood of attrition due to factors outside of the organization (e.g., higher salary and other benefits at other organizations as indicated by the BLS data). The determination of the likelihood of attrition may include predicting the likelihood of individuals leaving the organization due to outside incentives at other organizations, such as higher pay, for example.

In some embodiments, the BLS data may be used as training data to implement step 750 using a machine learning model. The BLS data may be used as training data in a similar way to the data received in step 730 that is associated with a plurality of individuals in the job role. The BLS training data may be used to train a machine learning model. Such a machine learning model may be used to perform step 750, where a prediction of the likelihood of attrition may be predicted using the attrition index. The machine learning model may be trained on a training dataset, including with BLS data and metrics data associated with the attrition index together with an associated rate of attrition. The trained machine learning model may be configured to predict the rate of attrition when provided with inputs including BLS data and metrics data associated with the attrition index.

As previously explained in the context of information associated with performance, method 740 may include step 743, which may be a process including translating information from the imported BLS data and assigning a binary value to categorical variables that represents each of the information in the set of data elements may be performed. For example, method 700 may contain a step 744 where multiple categorical variables may be assigned information. With respect to age, six categorical variables may be created where they are defined by age groups 1-24, 25-27, 28-34, 35-44, 45-64, and 64+. As an example, if information indicates that an individual is 36 years old, then method 740 may include an output 745 where the categorical variable associated with the age group 35-44 will be assigned the value, or set to, 1. Alternatively, if the pre-determined criteria are not met, method 740 may contain an output 746 where the categorical variable is set to zero.

Figure 9:
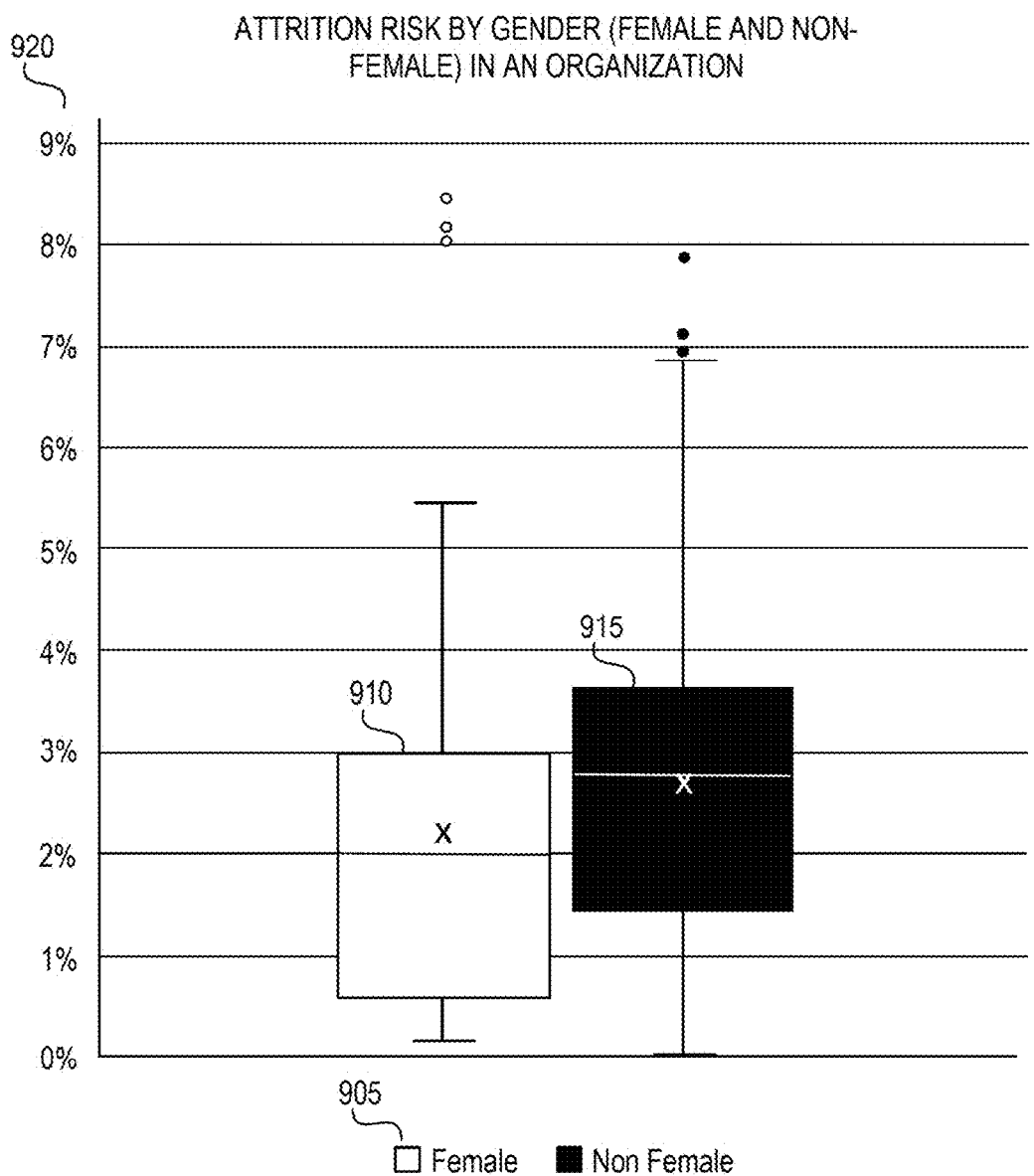
FIG. 9 illustrates an output of the attrition model algorithm displaying the attrition risk of individuals in an organization by different demographic groups, according to embodiments of the present disclosure.

FIG. 9 illustrates an output of the attrition model algorithm 900 displaying the attrition risk of individuals in an organization by different demographic groups, according to embodiments of the present disclosure. The demographic groups 905 shown in FIG. 9 are Female 910 and Non Female 915. In FIG. 9, for each group displayed, for example, "Group 1," the left box represents Female 910 and the right box represents Non-Female. An organization may be a job family or team. As shown in FIG. 9, an attrition risk 920 may be presented as a percentage based on the combination of each likelihood of attrition for each individual. This transformation from likelihood of attrition of each individual to an attrition risk 920 of a group may be performed by calculating the number of likelihood of attrition events being positive or true (or assigned a 1) compared to the total number of individuals in a specific group. For example, in FIG. 9 the mean attrition risk 920 calculated for individuals of the Female 910 demographic group may be calculated to be 2%, meaning that 2 in 100 individuals in the Female 910 demographic group of the organization have a positive likelihood of attrition. Thus, attrition risk 920 may provide a predictor of expected attrition over a period of time for a group of individuals. Adjusting input parameters related to attrition may allow a user to evaluate changes within the organization to reduce attrition risk.

In some embodiments, the attrition risk 920 presented in FIG. 9 may present the attrition risk 920 for other demographic groups, such as POC groups or ethnic groups.

Figure 10:
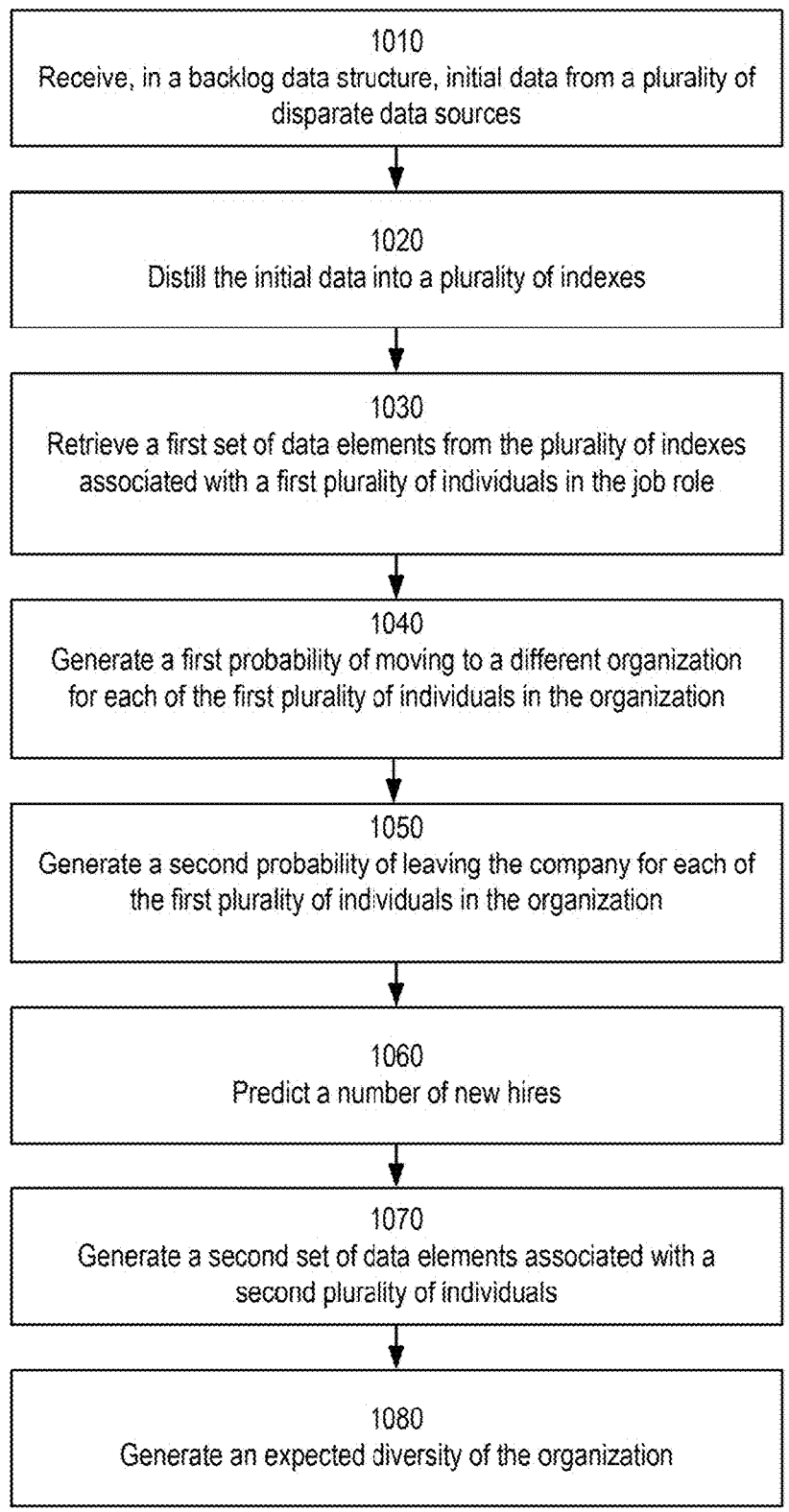
FIG. 10 presents a flowchart illustrating an exemplary method for forecasting diversity, according to embodiments of the present disclosure.

FIG. 10 presents a flowchart describing the diversity forecasting algorithm, according to embodiments of the present disclosure. The diversity forecasting algorithm may be stored as instructions in a non-transitory computer readable medium. The non-transitory computer readable medium may include at least one processor that executes the diversity forecasting algorithm to predict the diversity of an organization within a company over a duration of time.

As shown in FIG. 10, method 1000 may include step 1010 of receiving data from a plurality of disparate data sources, the data including a plurality of variables associated with diversity forecasting. Diversity forecasting may refer to predicting the future diversity of the workforce (e.g., plurality of entities) based on current trends and demographics. Variables associated with diversity forecasting may include demographic trends, hiring practices, retention rates, and employee engagement levels. For example, the data received from the plurality of disparate data sources may include observed employee movement over a period of time. Employee movement may refer to changes in job roles (e.g., from one job to another job) for employees in the company. Observed employee movement may refer to a record kept related to changes in job roles for employees over a period of time. The data may further include correspondence data, survey response data, payroll data, and talent data. Each variable of the plurality of variables may be associated with a data type and an entity of a plurality of entities in a first position. Elements of the received data may correspond to data types and variables associated with diversity forecasting regarding the plurality of entities in the position.

Method 1000 may include step 1020 of distilling the data into a plurality of indexes to convert the data into the plurality of indexes to be usable by a single data structure. The plurality of indexes may include velocity index, attrition and network analytics index. The data may be distilled by assigning a binary value to each variable of the plurality of variables, wherein each variable is a categorical value, a numerical value, or an ordinal value, by generating, using the binary value of each variable, an index for each data type and each entity of the total plurality of entities and by storing each index in a database. Details explaining the distilling and converting of the data are described and exemplified elsewhere in this disclosure. Step 1020 may improve computer performance speed because processor 1301, as shown in FIG. 13, may only need to access the indexes in a single data structure. The details of how step 1020 improves computer performance speed are described and exemplified elsewhere in this disclosure. Furthermore, step 1020 may improve computer performance by conserving computer memory in memory 1302, shown in FIG. 13. Details of how step 1020 conserves computer memory are described and exemplified elsewhere in this disclosure.

As shown in FIG. 10, method 1000 may include step 1030 of retrieving a first set of data elements from the plurality of indexes associated with a first plurality of entities. The first probability may be calculated by a first mathematical transformation that includes the velocity index, attrition and network analytics index. For example, the first plurality of entities may be individuals who are currently in the organization. The organization may be a job family or a team. The information included in the first set of data elements may include a velocity index, social networking index, pay equity score, engagement score, attrition, network analytic index and one or more demographic traits. Processes of obtaining a velocity index and likelihood of attrition are discussed in the above sections of this disclosure.

A social networking index may quantify the engagement and social network of an individual. The engagement of an individual may describe how engaged they are with other individuals in their company. The engagement score may quantify the engagement of an individual. The social network of an individual may describe the amount of people they know and interact with within and/or outside of their company. The social network index may be measured through internal email traffic and resulting patterns. An employee's internal Social Network Analytic Index (SNA), or social network index, may include the following: dividing the number of sent emails by the number of received emails; the unique inbound and outbound contacts; the importance of node/employee connecting the graph (these employees may be called brokers); and the number of important nodes/employees. Cross-line-of-business (cross-LOB) connections may also be considered for job roles that are revenue generating, or cross-selling. The contents, or body, of emails are not read or analyzed.

A pay equity score may quantify the salary, equity, and incentive that an individual receives in relation to their work performance. The pay equity score may show whether individuals in similar job roles who have similar work performance quality are paid similarly. Pay equity scores may be calculated by analyzing factors such as job title, experience, education, and performance to determine any disparities in pay between employees of different genders, races, or other demographic groups.

As shown in FIG. 10, method 1000 may include a step 1040 where a first probability of moving to a different position for each of the plurality of entities in the organization may be generated. The first probability may be calculated by a first mathematical transformation that includes the velocity index, social networking index, pay equity score, likelihood of attrition, and engagement score. The first mathematical transformation may be a weighted average of the values mentioned previously. In some embodiments, the first mathematical transformation may be a weighted sum of the values. In other embodiments, the first mathematical transformation may be an average, a sum or statistical calculation or numerical calculation may be used to perform the operation.

As shown in FIG. 10, method 1000 may include a step 1050 where a second probability of moving to a second different position for each of the plurality of entities in the organization may be generated. The second probability may be calculated by a second mathematical transformation that may include the velocity index, social networking index, pay equity score, attrition, network analytic index and engagement score. The second mathematical transformation may be a weighted average of the values mentioned previously. In some embodiments, the second mathematical transformation may be a weighted sum of the values. In other embodiments, the second mathematical transformation may be an average or a sum (not weighted). Thus, the first probability relates to the probability of moving to a first different position and the second probability relates to the probability of moving to a second different position.

As shown in FIG. 10, method 1000 may include a step 1060 of predicting the number of second entities that may include a number of entities expected to move to the first position. For example, a number of new hires may be predicted. The number of new hires may be a number of individuals expected to join the organization. The prediction may be performed by importing data associated with previous hiring practices. For example, the average number of new hires over a past three-month duration may be used as the predicted number of new hires. The duration is not limited to three months.

As shown in FIG. 10, method 1000 may include a step 1070 where a second set of data elements associated with a second plurality of entities may be generated. The second set of data elements may include data based on the prediction of the number of entities that may be expected to move to the first position. The second plurality of entities may be a hypothetical group of individuals who are predicted to be part of an organization. The generating may include applying a third mathematical transformation to the first probability of step 1040, the second probability of step 1050, and the prediction of the number of second entities 1060 (e.g., number of new hires). For example, the first probability of step 1040 and second probability of step 1050 may predict a number of individuals that will leave the organization. The number of new hires of step 1060 may provide a number of individuals that will enter or join the organization. Thus, the second plurality of individuals may be predicted by subtracting the number of individuals provided by the first and second probabilities of steps 1040 and 1050 and by adding the number of individuals provided by the number of new hires of step 1060. In some embodiments, the information, such as demographic traits, associated with each individual predicted by the first and second probabilities may be identified. Information, such as demographic traits, may be assigned to each individual in the number of individuals provided by the number of new hires.

Method 1000 also may include a step 1080, where an expected composition of entities in the first position may be generated. Composition of entities in a position may include the mix of the workforce in the position based on factors such as age, gender, education level, experience, and job role. The generating may include identifying at least one data category of each of the second plurality of entities. Based on the prediction of the number of entities that may be expected to move to the first position, in step 1080, the expected composition may be calculated. The expected composition may include the diversity of the entities in the first position. For example, an expected diversity of the organization may be generated based on the prediction of the number of new hires and associated demographic traits. In some embodiments, the operations may further comprise displaying a visualization of the expected composition.

The operations may further include generating a graphical user interface containing information entry fields for receiving user input regarding input parameters. The input parameters associated with velocity index, attrition and network analytics index received in the entry fields of the graphical user interface may define the data to be used to calculate expected composition. The graphical user interface may allow user input regarding input parameters associated with diversity of the organization. In some embodiments, the graphical user interface may be provided for display on a user device. The operations may further include receiving, from the graphical user interface via the user device, one or more input parameters. The one or more input parameters may change one or more of the first probability, the second probability, and the prediction of the number of second entities. The operations may further include generating a second expected composition of entities in the first position based on the one or more input parameters. In some embodiments, the operations may further comprise displaying a second visualization of the second expected composition. In some disclosed embodiments, entry at the graphical user interface may allow user input of input parameters to cause a prediction of expected composition in a first position over a period of time.

Figure 11:
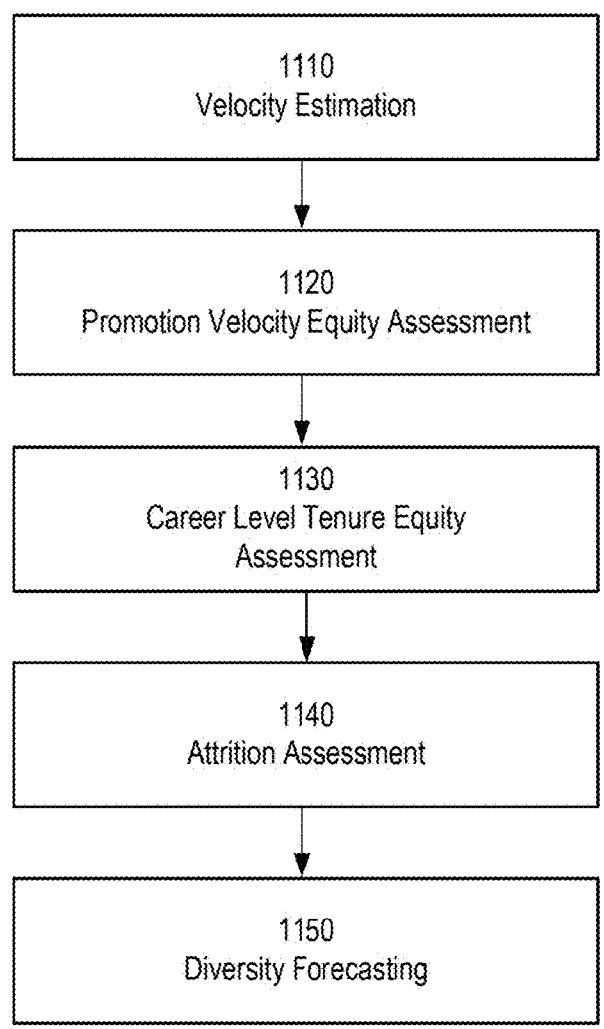
FIG. 11 presents a flowchart illustrating another exemplary method for forecasting diversity, according to embodiments of the present disclosure.

FIG. 11 presents a flowchart illustrating another exemplary method for forecasting diversity, according to embodiments of the present disclosure.

As shown in FIG. 11, method 1100 may contain a step 1110, and the velocity estimation step 1110 may include a linear mixed effects regression to estimate the expected time an employee (e.g., an employee currently in a job or career level, a new employee entering a job or career level) may spend in a given career level. Velocity estimation may include analyzing the career trajectory of an employee and predicting the future career growth of an employee based on their current performance and potential. The velocity estimation step 1110 may control for key factors impeding career movement such as job type, manager, job family, and the like. In some embodiments, controlling for key factors involves taking into account or adjusting for the effects of the factors impeding career movement that may be influencing the outcome of career movement.

As shown in FIG. 11, method 1100 may include step 1120, the promotion velocity assessment step. Promotion velocity assessment may include evaluating the rate of advancement of the employee within a company or organization. The evaluation may include assigning a score to the employee promotion potential. Step 1120 may include assigning the score to promoted employees using the velocity estimation step 1110. The expectation (or prediction) may be compared to an actual duration of time spent in a career level by an individual. A heuristic algorithm may be performed to flag differences in promotion velocity by gender or ethnicity. Flagging differences may involve identifying the variations in promotion velocity based on the gender or ethnicity of the individual versus a control group (e.g., a different gender or a specific ethnicity to compare with while performing the heuristic algorithm). Flagging differences may be performed by setting a categorical variable associated with a certain value, such as gender or ethnicity, to a 1 (similar to the process discussed previously).

As shown in FIG. 11, method 1100 may include step 1130, the career level tenure equity assessment step. Career level tenure equity assessment may refer to evaluating the fairness and equity of promotion policies based on the length of service and career level of an employee. The career level tenure equity assessment step 1130 may include using the velocity estimation step 1110 to estimate an expected time in a current level of an individual or a group of individuals. A heuristic algorithm may be used to examine individuals with actual durations of time in a role exceed the expected time in the current level or role. Differences by gender or ethnicity may be flagged.

As shown in FIG. 11, method 1100 may include the attrition assessment step 1140. As described and exemplified previously, attrition may be predicted using an attrition index and in step 1140 an attrition assessment may be performed based on the attrition and/or attrition index. In method 1100, step 1140 may include a logistic regression used to predict a likelihood of attrition within a time window. In some embodiments, the time window may be three (3) months. A distribution of attrition risk by gender and ethnicity may be assessed for key job families, as shown in FIG. 9.

As shown in FIG. 11, method 1100 may include step 1150, diversity forecasting. As described previously, diversity forecasting may include predicting the future diversity of the employees of a company based on current trends and demographics. In method 1100, the diversity forecasting step 1150 may include using matrix mathematics to estimate a probability of transitioning to new roles, terminations of individuals in a job role, and/or hiring of new individuals in the job role. The transition probabilities may be applied to a current employee base, or plurality of individuals, and grouped by demographic traits such as gender or ethnicity. An expected diversity may be forecasted over a time window based on the transition probabilities and/or hiring practices. In some embodiments, the time window may be five (5) years. In some embodiments, the diversity forecasting step 1150 may allow a user input to generate scenarios of changes in the diversity of hiring, promotion, and retention. In some embodiments, the user input may change at least one of the first probability, the second probability, or the number of new hires. The diversity forecasting step 1150 may generate an expected or estimated diversity over a time window. In some embodiments, the time window may be five (5) years.

Figures 12A, 12B:
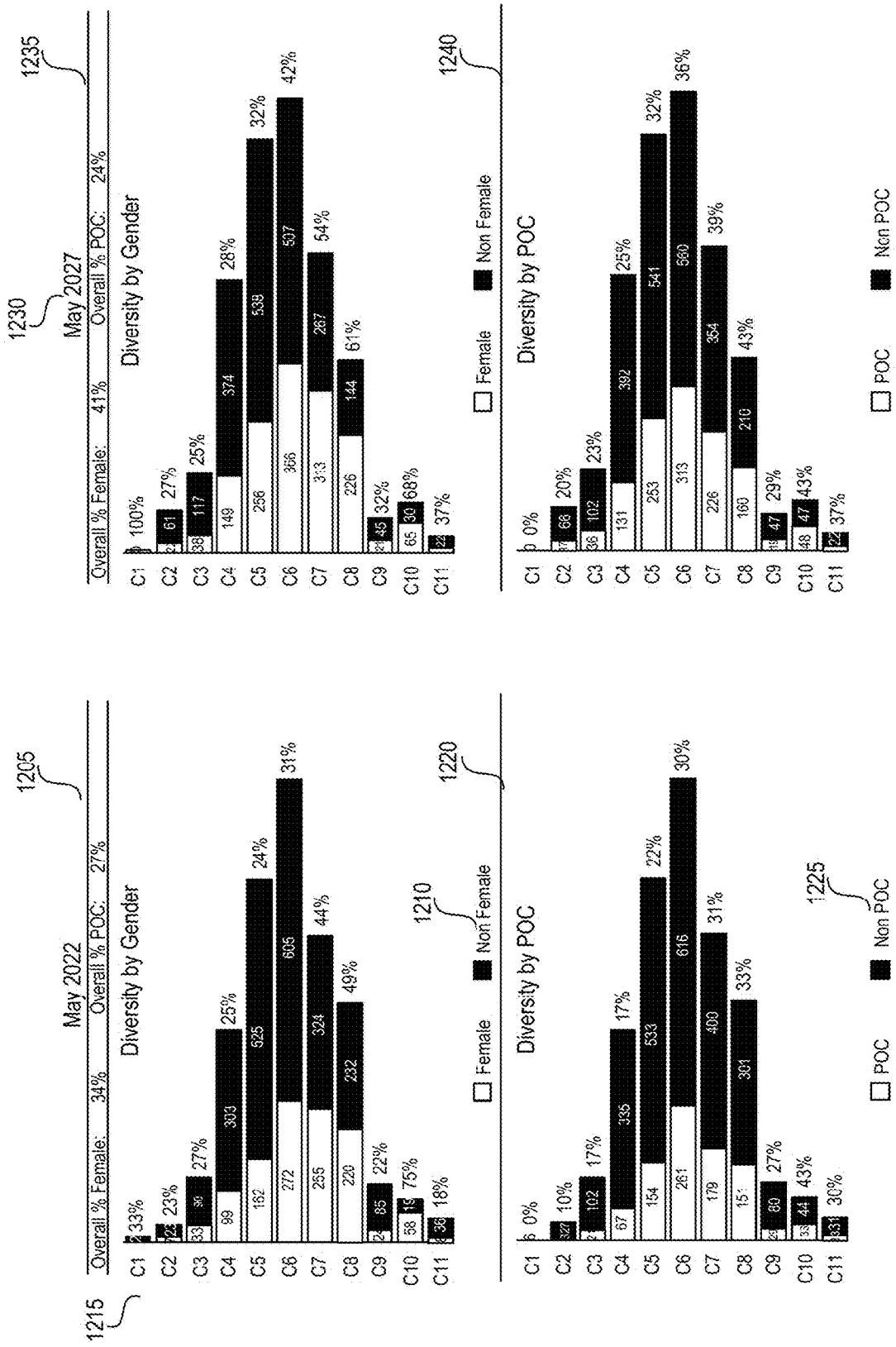
FIG. 12A illustrates an exemplary output of the diversity forecasting algorithm showing the present diversity within a company, according to embodiments of the present disclosure.
FIG. 12B illustrates an exemplary output of the diversity forecasting algorithm showing a predicted, or expected, diversity within a company, according to embodiments of the present disclosure.

FIG. 12A illustrates an output of the diversity forecasting algorithm showing the present diversity within a company, according to embodiments of the present disclosure. As shown in the top chart of FIG. 12A, the present diversity output may display groups by gender 1205, such as Female and Non Female 1210. As shown in the bottom chart of FIG. 12A, the present diversity output may display groups by ethnicity, such as POC and Non POC 1225. Each horizontal bar may be associated with a different career level 1215 (e.g., C1 is a generic term for a first career level 1215) and show the diversity within that job role. In other embodiments, the output may display the present diversity within a single job role instead of a company. In other embodiments, the output may display the present diversity in which the career levels may instead be job roles. In some embodiments, the diversity output may show terminations or termination rates, as opposed to active employees. Furthermore, in some embodiments, the diversity output may show new hires. The output may be generated to a spreadsheet or table.

FIG. 12B illustrates an output of the diversity forecasting algorithm showing a predicted, or expected, diversity within a company, according to embodiments of the present disclosure. As shown in FIG. 12B, the diversity may be predicted for five years from a previously specified date 1235 (shown by example as May 2022 in FIG. 12A and May 2027 in FIG. 12B). As shown in the top chart of FIG. 12B, the diversity forecast may display groups by gender 1230, such as Female and Non Female 1210. As shown in the bottom chart of FIG. 12B, the diversity forecast may display groups by ethnicity 1240, such as POC and Non POC 1225. Each horizontal bar may be associated with a different career level 1215 and show the diversity within that career level 1215. In other embodiments, the output may display the present diversity where each horizontal bar is associated with a different job role. In other embodiments, the output may display the present diversity within a job role. In some embodiments, the diversity output may show terminations or termination rates, as opposed to active employees, which is what is currently displayed. The output may be generated to a spreadsheet or table.

As shown in FIG. 13, the system may include at least one processor, like processor 1301, for example. Processor 1301 may be connected to memory 1302. Processor 1301 may also be connected to user interface 1303. User interface 1303 may contain information entry fields 1304 for receiving user input. These inputs may be, for example, but are not limited to, one or more diversity input parameters. Processor 1301 may receive user inputs 1306 from user interface 1303. User interface 1303 may also contain a visualization output 1305. Processor 1301 may communicate displays 1307 to user interface 1303 for display on visualization output 1305. Such visualizations may be, for example, but are not limited to, the output of the diversity forecasting algorithm as shown in FIG. 12B.

Figure 14A:
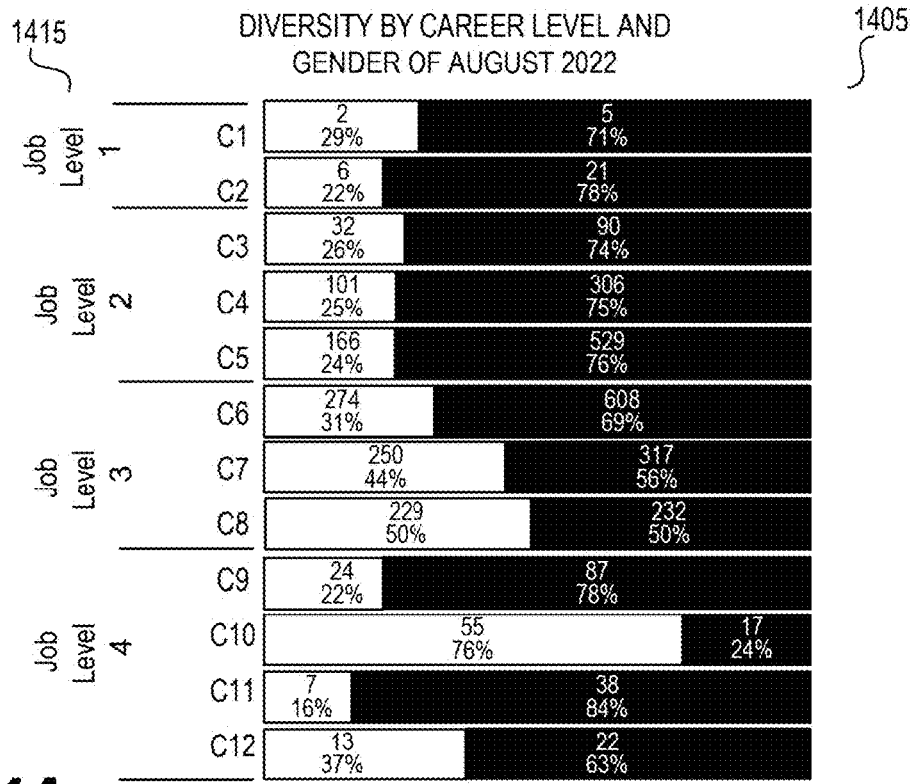
FIG. 14A illustrates an exemplary output of the diversity forecasting algorithm showing present diversity of career levels within a company, according to embodiments of the present disclosure.

FIG. 14A illustrates an exemplary output of the diversity forecasting algorithm showing the present diversity of career levels within a company, according to embodiments of the present disclosure. As shown in FIG. 14A, the diversity 1405 of each career level 1415 (denoted by the letter "C" and followed by a number) may be displayed or visualized. The career levels may be further grouped by job level, sometimes called a career suite. In some embodiments, the diversity of job roles may be displayed and may be further grouped by career level 1415. The demographic trait shown may be gender, such as Female and Non Female 1410, as shown in FIG. 14A. In other embodiments, the demographic trait shown may be ethnicity. In some embodiments, multiple demographic traits may be displayed.

Figure 14B:
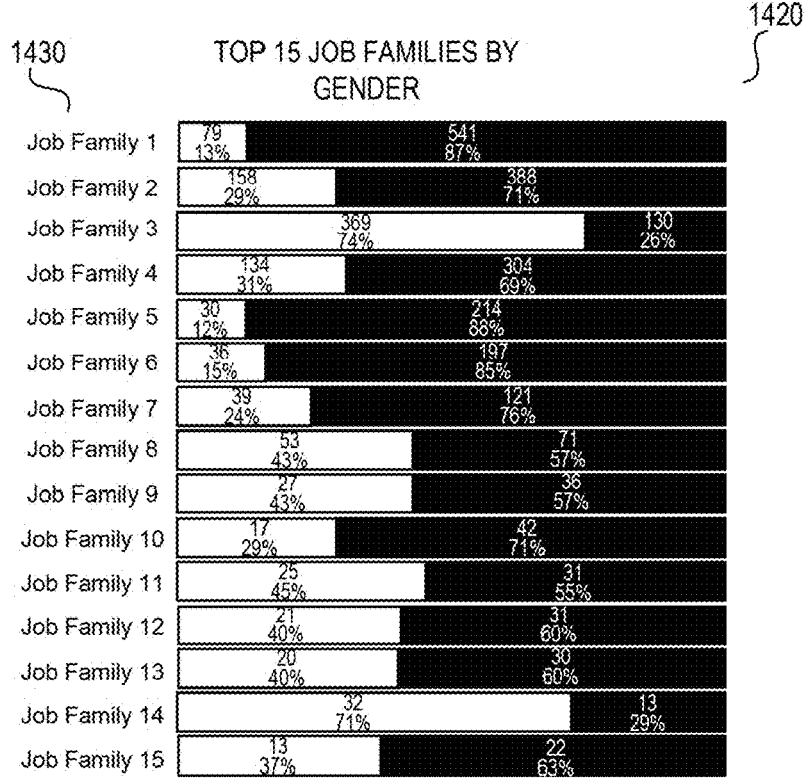
FIG. 14B illustrates an exemplary output of the diversity forecasting algorithm showing present diversity of the top 15 job families in a company, according to embodiments of the present disclosure.

FIG. 14B illustrates another exemplary output of the diversity forecasting algorithm showing the present diversity of the top 15 job families in a company 1420, according to embodiments of the present disclosure. In some embodiments, any job families 1430, not just the top 15, may be shown. In other embodiments, career levels may be shown instead of job families 1430. The demographic trait shown may be gender, such as Female and Non Female 1425, as shown in FIG. 14B. In other embodiments, the demographic trait shown may be ethnicity. In some embodiments, multiple demographic traits may be displayed.

Figure 15:
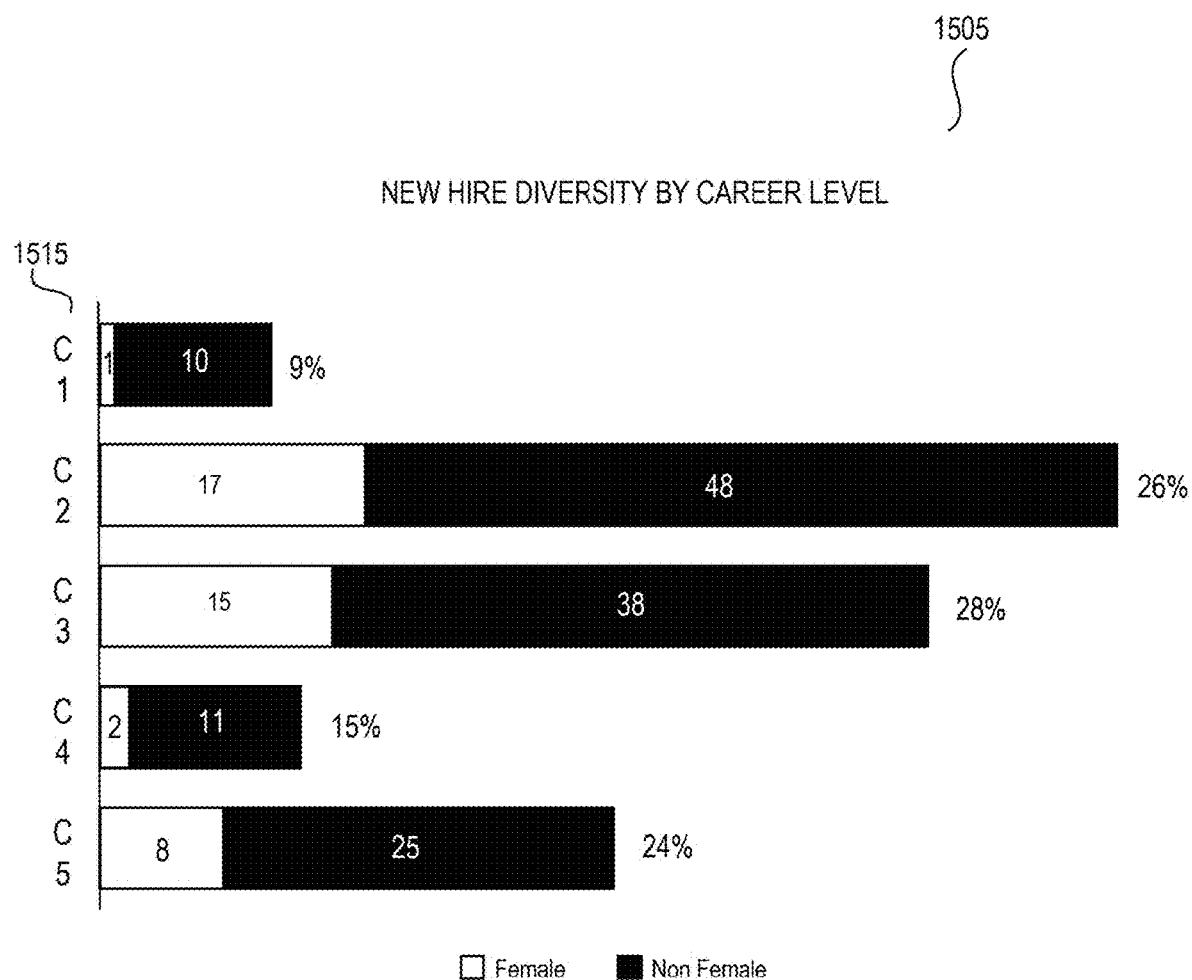
FIG. 15 illustrates an exemplary output of the diversity forecasting algorithm showing the present diversity of new hires by on career level, according to embodiments of the present disclosure.

FIG. 15 illustrates an exemplary output of the diversity forecasting algorithm showing the present diversity of new hires by career level 1505, according to embodiments of the present disclosure. The output may display groupings by career level 1515 (denoted by the letter "C" and followed by a number). In other embodiments, the output may display groupings by job families. The demographic trait shown may be gender, such as Female or Non Female 1510, as shown in FIG. 15. In other embodiments, the demographic trait shown may be ethnicity. In some embodiments, multiple demographic traits may be displayed.

The number of individuals in each category may be shown on the output. For example, in FIG. 15, the output shows 1 female new hire and 10 non-female new hires in the C1 career level. A percentage may be displayed that shows the percentage of female new hires compared to total new hires in a career level. For example, in C1, 9% of the new hires were female (1 female, 10 Non Female).

Figure 16:
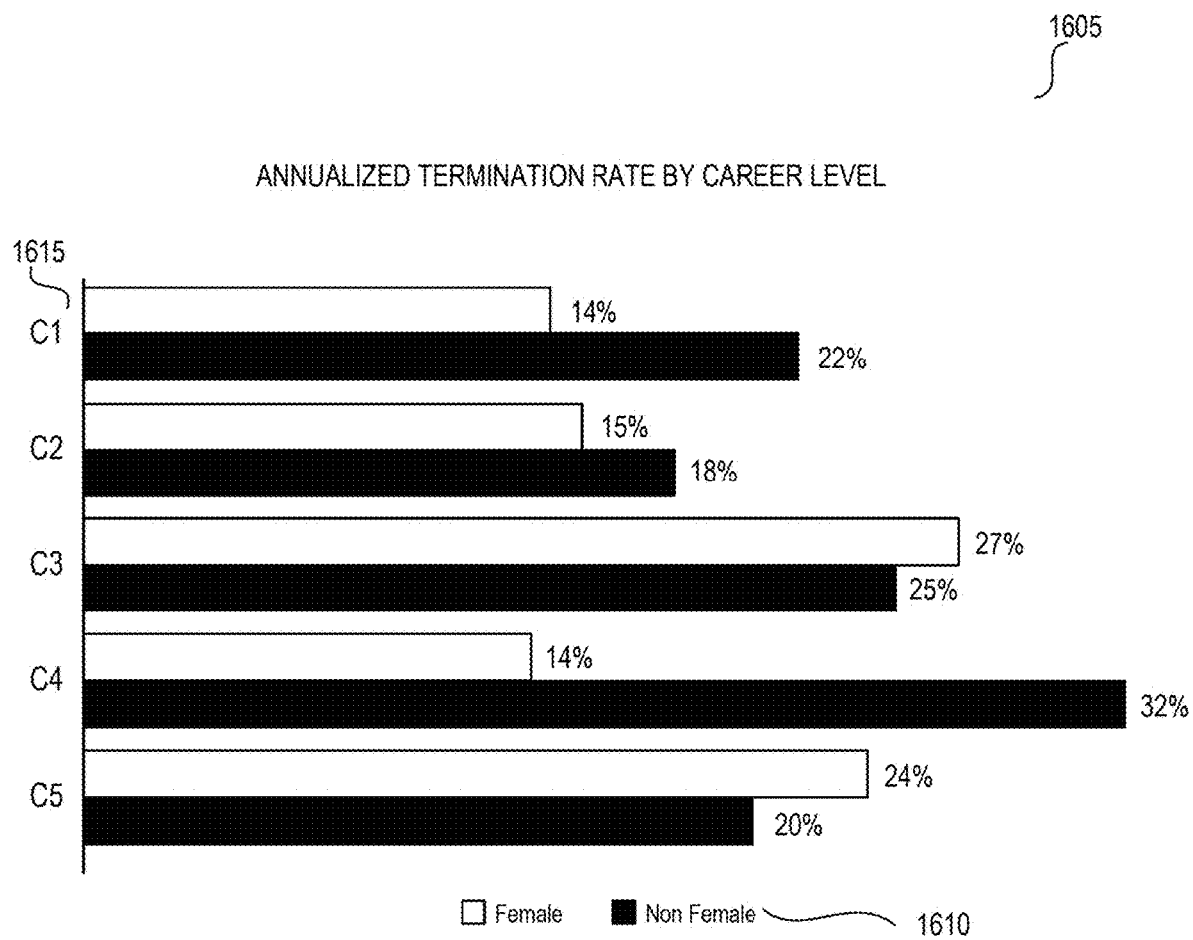
FIG. 16 illustrates an exemplary output of the diversity forecasting algorithm showing the diversity of annual terminations by career level, according to embodiments of the present disclosure.

FIG. 16 illustrates an exemplary output of the diversity forecasting algorithm showing the diversity of annual terminations by career level 1605, according to embodiments of the present disclosure. In some embodiments, the diversity of annual terminations may be shown by job families and/or job roles instead of career level 1615. As shown in FIG. 16, the annualized termination rate by gender, such as Female and Non Female 1610 may be shown. For example, in C1 the annualized termination rate of individuals identifying as female is 14% and the termination rate of individuals identifying as male is 22%. In some embodiments, the demographic trait shown may be ethnicity. In other embodiments, multiple demographic traits may be displayed.

Figure 17:
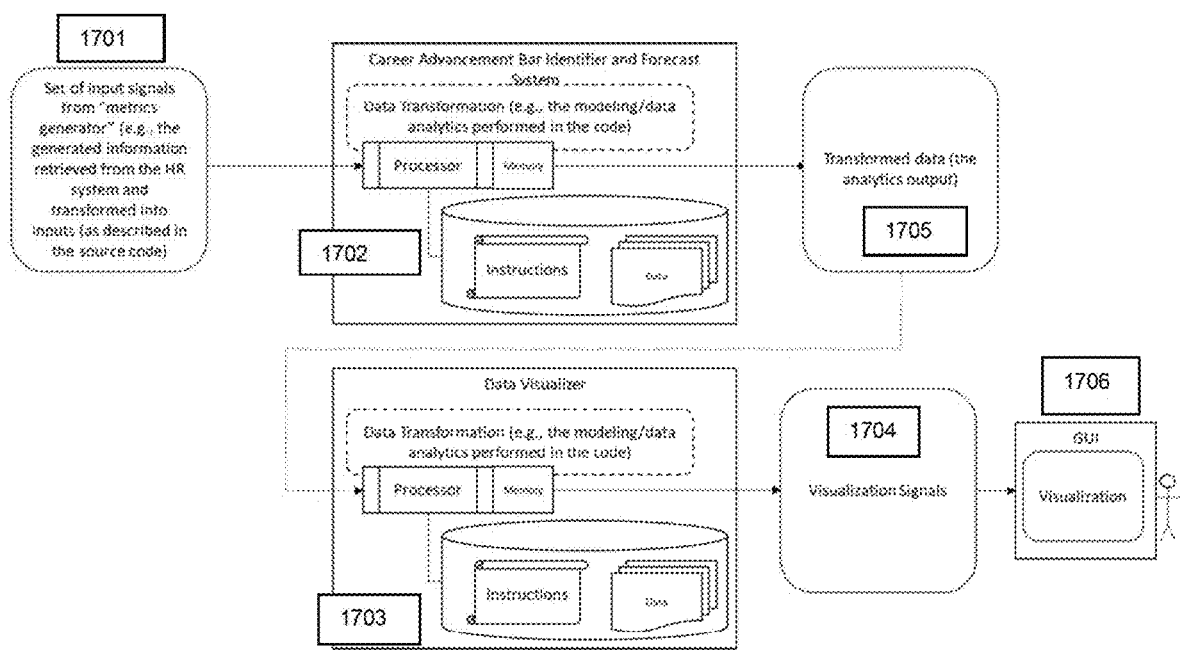
FIG. 17 illustrates an exemplary transformation of the data that can be presented to a user via a user display, according to embodiments of the present disclosure.

FIG. 17 illustrates the use of data visualization tools to display model results to a user using a graphical user interface 1706. Some embodiments of the present disclosure may transform the data that can be presented to a user via a user display. Input signals such as information received from the HR system and transformed into input described in the source code, 1701 may be sent to the processor 1702, where, based on the input signals, data may be pulled from the memory to undergo a data conversion or transformation. In some embodiments, the processor contains a set of instructions, embedded in the code, that may be executable by the processor to facilitate the transformation of data into a plurality of indexes. In other embodiments, the processor is responsible for analyzing, manipulating, and interpreting the input signal. In other embodiments, the processor is a software program. In other embodiments, the processor is a hardware device. In other embodiments, the processor is a digital signal processor that uses discrete signals represented in binary code. For example, the data conversion may be performed by assigning a binary value to each variable of the plurality of variables, wherein each variable is a categorical value, a numerical value, or an ordinal value, by generating, using the binary value of each variable, an index for each data type and each entity of the plurality of entities and by storing each index in a database. The plurality of indexes help identify potential bars on career advancement and may forecast the career trajectory of members of the organization. The transformed data 1705 undergoes a second data transformation 1703, as described above. In some embodiments, visualization signals 1704 from the processor may sent to the graphical user interface (GUI) 1706. In other embodiments, the visualization signal facilitates the visualization of large data set in a way that allows a user to understand the data. For example, the processor may retrieve attrition data from HR, transform the data, and send a visualization signal for the GUI to display a graph to show the attrition rate of male and female employees in the same job role. The GUI 1706 displays the transformed data to the user with different output options. In some embodiment, the output is shown in various formats, such as graphs, videos, images, or plain text. Members of the organization may then access and analyze the data.

Figure 18:
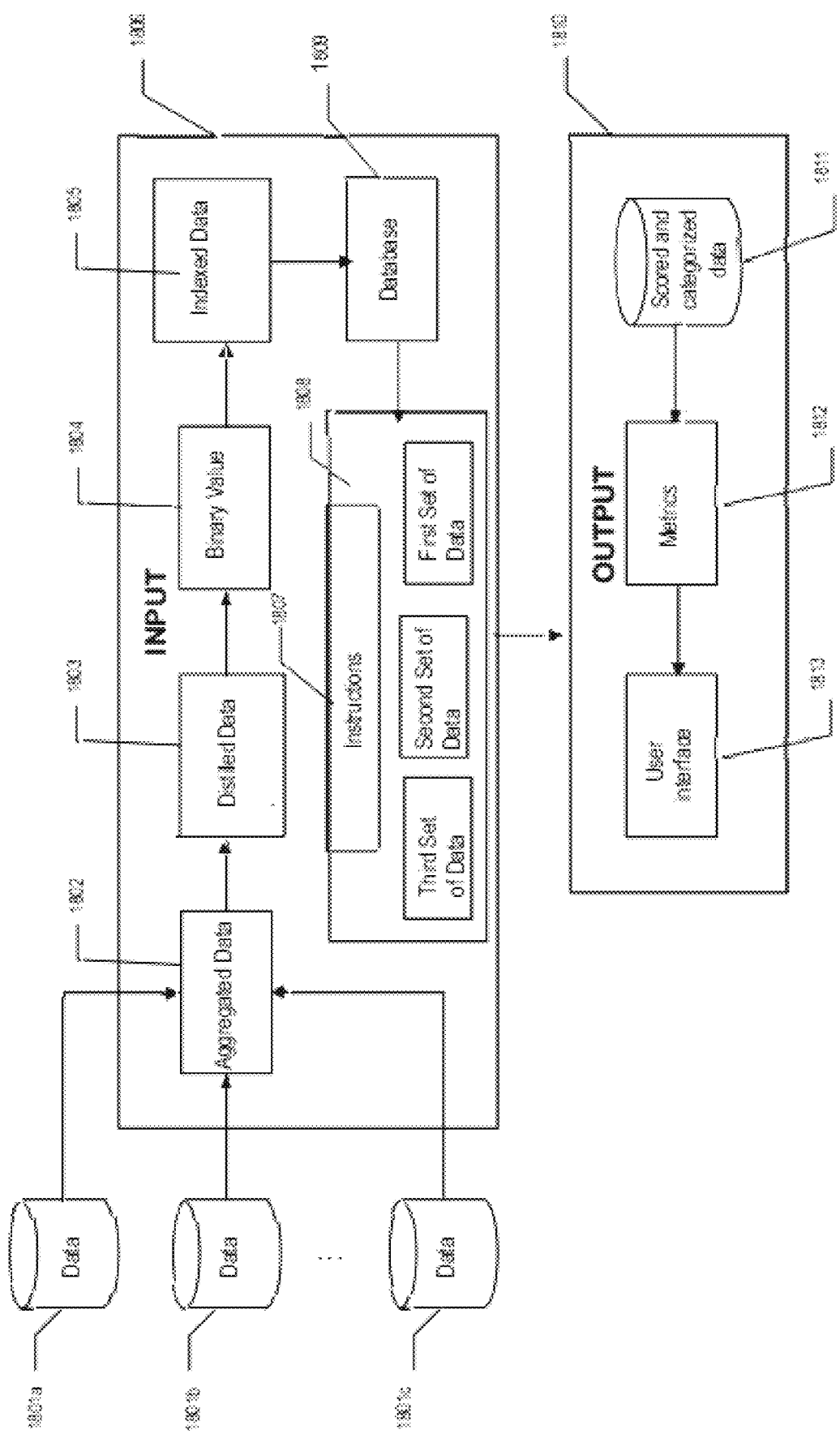
FIG. 18 illustrates the exemplary flow of transformed data, according to embodiments of the present disclosure.

FIG. 18 illustrates the flow of data received from a plurality of disparate data sources 1801a, 1801b, and 1801c. In some embodiments, the data may include a plurality of variables, wherein each variable of the plurality of variables is associated with a data type and an entity of a plurality of entities. The flow of data may include aggregating 1802 the data and distilling 1803 the data into a plurality of indexes to convert the data to be usable by a single data structure. In some embodiments, a binary value 1804 is assigned to each variable of the plurality of variables, wherein each variable may be a categorical value, a numerical value, or an ordinal value, by generating, using the binary value of each variable, an index 1805 for each data type and each entity of the total plurality of entities and by storing each index in a database 1809. In other embodiments, the operations described above may be performed by at least one processor 1808 configured to execute instructions in a system for identifying a velocity model for a plurality of positions and predicting outcomes for the plurality of positions. In such embodiments, each data set undergoes a mathematical transformation by at least one processor configured to execute instructions 1807, by calculating a mean, median or other type of statistical or numerical value, of the categorical variables that include the velocity index, attrition, and network analytic index. For example, the operations may include retrieving a first set of data elements associated with the plurality of entities from the plurality of indexes, wherein the first set of data elements includes information associated with a velocity index, attrition, and network analytic index. Similarly, the operations may also include generating a second probability of moving to a second different position for each of the plurality of entities. The second probability may be calculated by a second mathematical transformation that includes the velocity index, attrition, and network analytic index. The transformed data 1811 may be categorized or grouped based on specific criteria or characteristics, numerical information and/or statistical data type. The output may be the transformation of the data that can be presented to a user via a user display. 1810. The transformed data may be incorporated into the systems and methods disclosed herein to generate metrics 1812 at given points throughout the employment of an employee and transfer those metrics about specific individuals into an interactive user interface 1813 for organizations to systematically identify key metrics specific to members of protected classes or the organization at large.

Figure 19:
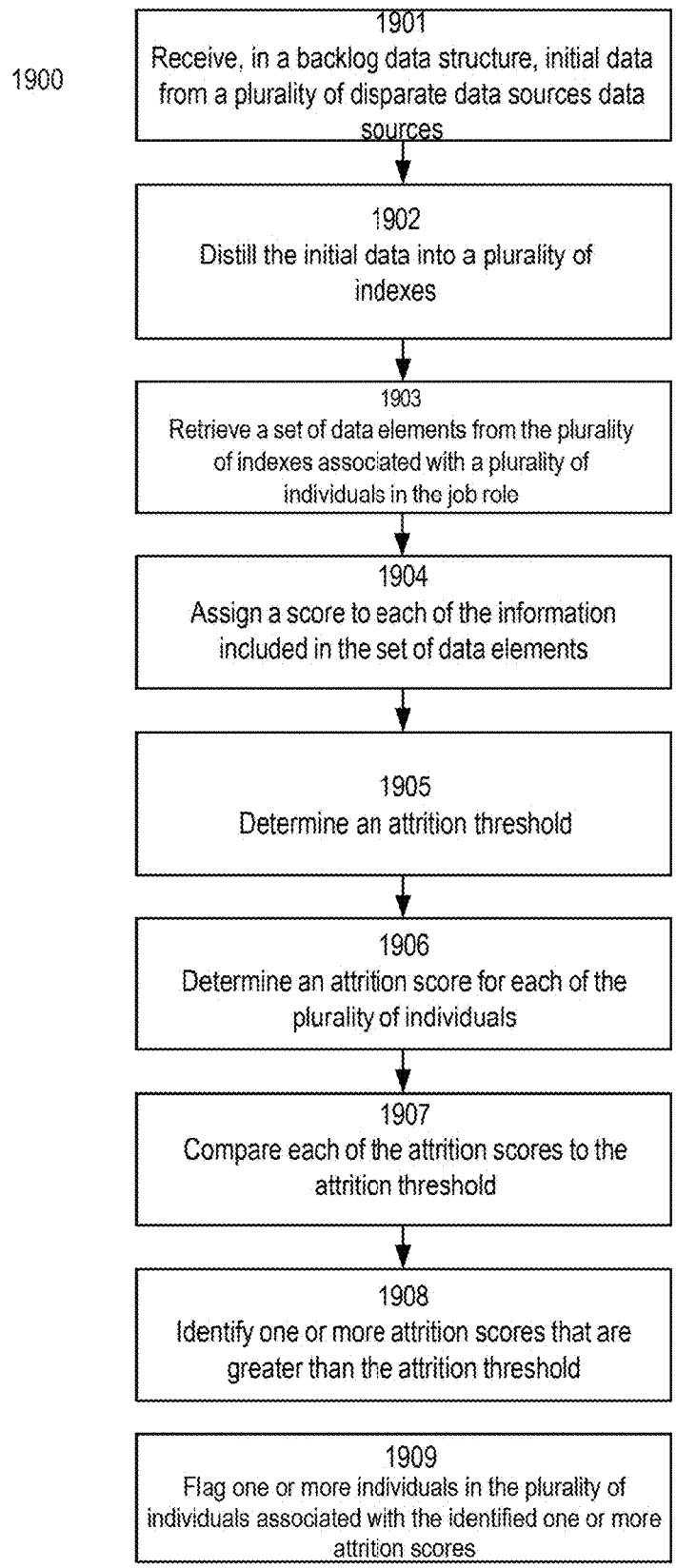
FIG. 19 illustrates a flow chart showing the attrition profile for a plurality of individuals, according to embodiments of the present disclosure.

FIG. 19 illustrates a flow chart 1900 showing the flow of initial data from a plurality of disparate data sources to attrition scores that may be flagged from a plurality of individuals 1909. At step 1901, the operations may include receiving data available to the organization from a plurality of disparate data sources. The data may include a plurality of variables, wherein each variable of the plurality of variables is associated with a data type and an entity of a plurality of entities in a position. The set of data elements may include information associated with at least one of tenure, years in the job role, age, commute distance, performance, and payroll data. The set of data elements may also include backlogged or unused data available to the organization, such as commute distance and time. For example, an organization may flag a plurality of employees with a similar commute distance with an unfavorable attrition score. Once these employees are flagged, the organization may implement a plan to reduce the commute distance for the flagged employees to promote retention of these employees.

At step 1902, the operations may further include distilling the data into a plurality of indexes. The distilling may convert the data into a plurality of indexes to be usable by a single data structure. The distilling may convert the data into a plurality of indexes to be usable by a single data structure. The data conversion may be performed by assigning a binary value to each variable of the plurality of variables, wherein each variable is a categorical value, a numerical value, or an ordinal value, by generating, using the binary value of each variable, an index for each data type and each entity of the plurality of entities and by storing each index in a database. At step 1903, a set of data may be retrieved from the plurality of indexes associated with a plurality of individuals in the job role. For example, data pertaining to information associated with at least one of tenure, years in the job role, age, commute distance, performance, or payroll may be retrieved from the plurality of indexes associated with a plurality of individuals in a job role.

At step 1904, an attrition index score may be assigned to each set of information included in the set of data elements. For example, when analyzing the data pertaining to commute time for a plurality of employees in the same job role, a shorter commute may garner a more favorable attrition score than a longer commute. An attrition model algorithm may be stored as instructions in a non-transitory computer readable medium and may be used to determine an attrition threshold for the plurality of individuals in a job role. The non-transitory computer readable medium may include at least one processor that executes the attrition model algorithm to predict attrition of employees in a job role. The data conversion may be performed by assigning a binary value or score to each variable of the plurality of variables, wherein each variable is a categorical value, a numerical value, or an ordinal value, by generating, using the binary value of each variable, an index for each data type and each entity of the plurality of entities and by storing each index in a database. The operations may further comprise predicting, using the attrition index, attrition for each entity of the plurality of entities, wherein the attrition is a binary event.

At step 1905, an organization may determine an attrition threshold for the plurality of individuals in a job role based on the attrition score assigned to each of set of information included in the set of data elements. The attrition threshold may be the number or value associated with a set of data elements where the organization sees the most attrition. For example, employees with commutes longer than an hour may have a higher rate of attrition than employees with commutes of less than 15 minutes; therefore, a one hour commute may be the attrition threshold associated with employee commutes.

At step 1906, the non-transitory computer readable medium may include at least one processor that executes the attrition model algorithm described previously to determine an attrition score for each of the plurality of individuals in a job role to predict attrition of employees in that job role. For example, individuals with commutes longer than an hour may have a more unfavorable attrition score than individuals with commutes of less than 15 minutes. These attrition score may help an organization identify individuals at high risk of attrition.

At step 1907, an organization may compare the attrition scores of each of the plurality of individuals to the attrition threshold. The operations may further include creating a distribution of attrition for the position, as described in FIG. 9, wherein the distribution uses the attrition of each entity of the plurality of entities. The distribution may include the attrition indexes. The operations may further include generating, using the distribution, a quantity of a projected plurality of entities in the position over a duration of time. The operations may further include generating a visualization of the distribution. The distribution may use the likelihood of attrition of each of the plurality of individuals. The operations may further comprise generating, using the distribution, a quantity of a projected plurality of entities in the position over a duration of time. The operations may further comprise generating a visualization of the distribution.

At step 1908, attrition scores may be compared to the attrition threshold. Attrition scores greater than the attrition threshold may be systematically identified to predict attrition or promote retention in an organization. For example, a high attrition score associated with commute time may be identified if it is greater than the attrition threshold of the organization.

At step 1909, an organization may flag the individual associated with the high attrition score to mitigate the impact of the high attrition score and to develop a plan to retain such employees. For example, an organization may make transportation or housing arrangements for an individual that was flagged for having a commute longer than an hour, which is longer than the attrition threshold for employee commute.

The disclosed embodiments are not limited to the above-described examples, but instead are defined by the appended claims in light of their full scope of equivalents. Moreover, while illustrative embodiments have been described herein, the scope includes any and all embodiments having equivalent elements, modifications, omissions, combinations (e.g., of aspects across various embodiments), adaptations, or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps.

It is intended, therefore, that the specification and examples be considered as example only, with a true scope and spirit being indicated by the following claims and their full scope of equivalents.

What is claimed is:

1. A non-transitory computer readable medium storing instructions that, when executed by at least one processor, cause the at least one processor to perform operations comprising: receiving data from a plurality of disparate data sources, the data including a plurality of variables, wherein each variable of the plurality of variables is associated with a data type and an entity of a total plurality of entities; distilling the data into a plurality of indexes to convert the data into the plurality of indexes to be usable by a single data structure, by: assigning a binary value to each variable of the plurality of variables, wherein each variable is a categorical value, a numerical value, or an ordinal value; generating, using the binary value of each variable, an index for each data type and each entity of the total plurality of entities; and storing each index in a database; retrieving a first set of data elements from the plurality of indexes, the first set of data elements being associated with a first plurality of entities of the total plurality of entities; retrieving a second set of data elements from the plurality of indexes, the second set of data elements being associated with a second plurality of entities of the total plurality of entities; generating a predicted duration of time that the first plurality of entities will remain in a first position using the second set of data elements associated with the second plurality of entities; assigning a first velocity index to each of the first plurality of entities to obtain a plurality of first velocity indexes, wherein the first velocity index is directly proportional to a measure of closeness between the predicted duration and the actual duration of time in the position in the first set of data elements; assigning a second velocity index to each of the second plurality of entities to obtain a plurality of second velocity indexes, wherein the second velocity index is directly proportional to a measure of closeness between the predicted duration and the actual duration of time in the position in the second set of data elements; comparing each of the first velocity indexes to other first velocity indexes from among the plurality of first velocity indexes, wherein the comparing includes identifying differences between each of the first velocity indexes and identifying information associated with a data category of each of the first plurality of entities; comparing each of the second velocity indexes to other second velocity indexes from among the plurality of second velocity indexes, wherein the comparing includes identifying differences between each of the second velocity indexes and identifying information associated with the data category of each of the second plurality of entities; and generating, using the first plurality of velocity indexes and the second plurality of velocity indexes, a velocity model.

2. The non-transitory computer readable medium of claim 1, wherein the operations are performed for a plurality of positions.

3. The non-transitory computer readable medium of claim 1, the operations further comprising: creating a distribution of the velocity indexes, wherein the distribution includes the first and second velocity indexes; generating a score associated with an expectation that one or more entities in the first plurality of entities will move to another position; and generating, using the score, a quantity of a projected first plurality of entities in the position over a duration of time.

4. The non-transitory computer readable medium of claim 3, the operations further comprising: generating a graphical user interface containing information entry fields for receiving user input regarding input parameters; providing the graphical user interface for display on a user device; receiving, from the graphical user interface via the user device, one or more input parameters; and generating a second projected first plurality of entities in the position over the duration of time based on the one or more input parameters.

5. The non-transitory computer readable medium of claim 3, wherein the operations are performed for a plurality of positions.

6. The non-transitory computer readable medium of claim 4, wherein the operations are performed for a plurality of positions.

7. A method comprising: receiving data from a plurality of disparate data sources, the data including a plurality of variables, wherein each variable of the plurality of variables is associated with a data type and an entity of a total plurality of entities; distilling the data into a plurality of indexes to convert the data into the plurality of indexes to be usable by a single data structure, by: assigning a binary value to each variable of the plurality of variables, wherein each variable is a categorical value, a numerical value, or an ordinal value; generating, using the binary value of each variable, an index for each data type and each entity of the plurality of entities; and storing each index in a database; retrieving a first set of data elements from the plurality of indexes, the first set of data elements being associated with a first plurality of entities of the total plurality of entities; retrieving a second set of data elements from the plurality of indexes, the second set of data elements being associated with a second plurality of entities of the total plurality of entities; generating a predicted duration of time that the first plurality of entities will remain in a first position using the second set of data elements associated with the second plurality of entities; assigning a first velocity index to each of the first plurality of entities to obtain a plurality of first velocity indexes, wherein the first velocity index is directly proportional to a measure of closeness between the predicted duration and the actual duration of time in the position in the first set of data elements; assigning a second velocity index to each of the second plurality of entities to obtain a plurality of second velocity indexes, wherein the second velocity index is directly proportional to a measure of closeness between the predicted duration and the actual duration of time in the position in the second set of data elements; comparing each of the first velocity indexes to other first velocity indexes from among the plurality of first velocity indexes, wherein the comparing includes identifying differences between each of the first velocity indexes and identifying information associated with a data category of each of the first plurality of entities; comparing each of the second velocity indexes to other second velocity indexes from among the plurality of second velocity indexes, wherein the comparing includes identifying differences between each of the second velocity indexes and identifying information associated with the data category of each of the second plurality of entities; and generating, using the first plurality of velocity indexes and the second plurality of velocity indexes, a velocity model.

8. The method of claim 7, wherein the method is performed for a plurality of positions.

9. The method of claim 7, the method further comprising: creating a distribution of the velocity indexes, wherein the distribution includes the first and second velocity indexes; generating a score associated with an expectation that one or more entities in the first plurality of entities will move to another position; and generating, using the score, a quantity of a projected first plurality of entities in the position over a duration of time.

10. The method of claim 9, the method further comprising: generating a graphical user interface containing information entry fields for receiving user input regarding input parameters; providing the graphical user interface for display on a user device; receiving, from the graphical user interface via the user device, one or more input parameters; and generating a second projected first plurality of entities in the position over the duration of time based on the one or more input parameters.

11. The method of claim 9, wherein the method is performed for a plurality of positions.

12. The method of claim 10, wherein the method is performed for a plurality of positions.

13. A system comprising: a memory storing instructions; and at least one processor configured to execute the instructions to perform operations, including: receiving data from a plurality of disparate data sources, the data including a plurality of variables, wherein each variable of the plurality of variables is associated with a data type and an entity of a total plurality of entities; distilling the data into a plurality of indexes to convert the data into the plurality of indexes to be usable by a single data structure, by: assigning a binary value to each variable of the plurality of variables, wherein each variable is a categorical value, a numerical value, or an ordinal value; generating, using the binary value of each variable, an index for each data type and each entity of the plurality of entities; and storing each index in a database; retrieving a first set of data elements from the plurality of indexes, the first set of data elements being associated with a first plurality of entities of the total plurality of entities; retrieving a second set of data elements from the plurality of indexes, the second set of data elements being associated with a second plurality of entities of the total plurality of entities; generating a predicted duration of time that the first plurality of entities will remain in a first position using the second set of data elements associated with the second plurality of entities; assigning a first velocity index to each of the first plurality of entities to obtain a plurality of first velocity indexes, wherein the first velocity index is directly proportional to a measure of closeness between the predicted duration and the actual duration of time in the position in the first set of data elements; assigning a second velocity index to each of the second plurality of entities to obtain a plurality of second velocity indexes, wherein the second velocity index is directly proportional to a measure of closeness between the predicted duration and the actual duration of time in the position in the second set of data elements; comparing each of the first velocity indexes to other first velocity indexes from among the plurality of first velocity indexes, wherein the comparing includes identifying differences between each of the first velocity indexes and identifying information associated with a data category of each of the first plurality of entities; comparing each of the second velocity indexes to other second velocity indexes from among the plurality of second velocity indexes, wherein the comparing includes identifying differences between each of the second velocity indexes and identifying information associated with the data category of each of the second plurality of entities; and generating, using the first plurality of velocity indexes and the second plurality of velocity indexes, a velocity model.

14. The system of claim 13, wherein the operations are performed for a plurality of positions.

15. The system of claim 13, wherein the at least one processor is further configured to: create a distribution of the velocity indexes, wherein the distribution includes the first and second velocity indexes; generate a score associated with an expectation that one or more entities in the first plurality of entities will move to another position; and generate, using the score, a quantity of a projected first plurality of entities in the position over a duration of time.

16. The system of claim 15, wherein the at least one processor is further configured to: generate a graphical user interface containing information entry fields for receiving user input regarding input parameters; provide the graphical user interface for display on a user device; receive, from the graphical user interface via the user device, one or more input parameters; and generate a second projected first plurality of entities in the position over the duration of time based on the one or more input parameters.

17. The system of claim 15, wherein the operations are performed for a plurality of positions.

18. The system of claim 16, wherein the operations are performed for a plurality of positions.

* * * * *